US012597279B2

(12) United States Patent
Fadzeyeu et al.

(10) Patent No.: US 12,597,279 B2
(45) Date of Patent: Apr. 7, 2026

(54) SYSTEMS AND METHODS FOR DYNAMICALLY PROVIDING NOTARY SESSIONS

(71) Applicant: Notarize, Inc., Boston, MA (US)

(72) Inventors: Yauhen Fadzeyeu, Boston, MA (US); Jasmeet Arora, Saugus, MA (US)

(73) Assignee: Notarize, Inc., Boston, MA (US)

( * ) Notice: Subject to any disclaimer, the term of this patent is extended or adjusted under 35 U.S.C. 154(b) by 352 days.

(21) Appl. No.: 18/106,917

(22) Filed: Feb. 7, 2023

(65) Prior Publication Data

US 2023/0252809 A1      Aug. 10, 2023

(51) Int. Cl.
| | |
|---|---|
| *G06V 30/10* | (2022.01) |
| *G06F 40/186* | (2020.01) |
| *G06Q 50/18* | (2012.01) |

(52) U.S. Cl.
CPC ............ *G06V 30/10* (2022.01); *G06F 40/186* (2020.01); *G06Q 50/18* (2013.01); *G06V 2201/13* (2022.01)

(58) Field of Classification Search
CPC .... G06V 30/10; G06V 2201/13; G06V 30/41; G06F 40/186; G06F 40/30; G06Q 50/18
See application file for complete search history.

(56) References Cited

U.S. PATENT DOCUMENTS

| | | |
|---|---|---|
| 11,194,889 B2 | 12/2021 | Arngren et al. |
| 2003/0217264 A1 | 11/2003 | Martin et al. |

| | | | |
|---|---|---|---|
| 2012/0117636 A1 | 5/2012 | Adams | |
| 2012/0136793 A1 | 5/2012 | Valin et al. | |
| 2013/0325728 A1* | 12/2013 | Bialostok ............... | G06Q 10/06 |
| | | | 705/311 |

(Continued)

FOREIGN PATENT DOCUMENTS

| | | |
|---|---|---|
| CN | 111986054 B | 10/2022 |

OTHER PUBLICATIONS

Docusign Contributor "How Remote Online Notarization Works" pp. 1-9, Web. Nov. 4, 2021; [retrieved Jun. 7, 2023]. Retrieved from the internet <https://www.docusign.com/blog/how-remote-online-notarization-works>.

(Continued)

*Primary Examiner* — Iriana Cruz
(74) *Attorney, Agent, or Firm* — Wolf, Greenfield & Sacks, P.C.

(57) ABSTRACT

Disclosed embodiments include a method for dynamically providing notary sessions. The method can include receiving a document and one or more user-level notary requirements from a user device. Data entries can be extracted from the document and the document can be associated with a template. Document-level notary requirements can be determined based on the template and document. A first subset of active notary devices can be identified, and a first join request can be transmitted to the first subset. A first notary session between a first notary device and first user device can be initiated if the join request is accepted within a predetermined time threshold. If the join request is not accepted within a predetermined time threshold, the method can include identifying a second subset of active notary devices, transmitting a second join request, and initiating a second notary session between the first user device and second notary device.

15 Claims, 13 Drawing Sheets

(56)     References Cited

U.S. PATENT DOCUMENTS

| | | | |
|---|---|---|---|
| 2014/0033327 A1* | 1/2014 | Conte ..................... | G06F 21/60 |
| | | | 726/28 |
| 2016/0132807 A1* | 5/2016 | Camenzind ........... | G06Q 50/18 |
| | | | 705/7.23 |
| 2019/0130416 A1* | 5/2019 | Boudville .......... | G06Q 20/1085 |
| 2019/0319948 A1 | 10/2019 | Triola et al. | |
| 2021/0014454 A1* | 1/2021 | Rung ................. | H04L 65/4025 |
| 2021/0383004 A1* | 12/2021 | Manasse ................ | G06F 16/93 |
| 2022/0100905 A1* | 3/2022 | Hardy .................... | H04L 63/12 |
| 2022/0284526 A1* | 9/2022 | Hardy ................. | H04L 67/141 |
| 2022/0286293 A1* | 9/2022 | Hardy .................. | H04L 9/3247 |
| 2023/0252181 A1 | 8/2023 | Nagao | |
| 2023/0252188 A1 | 8/2023 | Apsingekar et al. | |
| 2023/0412695 A1* | 12/2023 | Hassan ............... | H04L 12/1818 |
| 2024/0143842 A1 | 5/2024 | Kinsel et al. | |

OTHER PUBLICATIONS

International Search Report, PCT/US23/12535, mail date Jul. 19, 2023.

Soderstrom, Self-Contained Digitally Signed Documents: Approaching "What You See is What You Sign". IEEE International Conference on Information Science & Applications (ICISA), 2014;pp. 1-4.

Extended European Search Report for European Application No. 23921528.8, dated Dec. 9, 2025.

Rieger et al., Digital image recording for court-related purposes. In Proceedings IEEE 33rd Annual 1999 International Carnahan Conference on Security Technology (Cat. No. 99CH36303);1999:262-79.

* cited by examiner

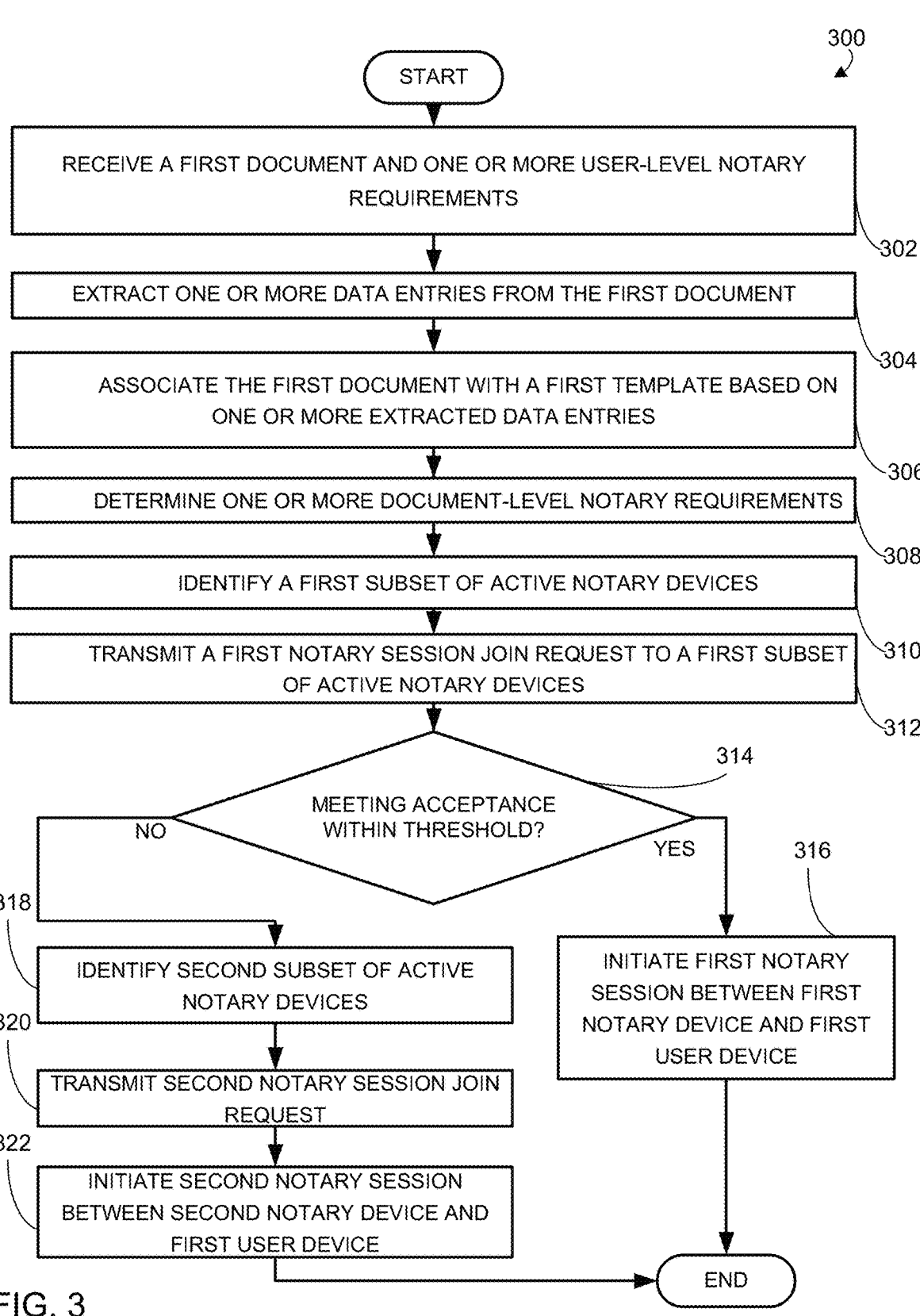

300

START

RECEIVE A FIRST DOCUMENT AND ONE OR MORE USER-LEVEL NOTARY REQUIREMENTS
302

EXTRACT ONE OR MORE DATA ENTRIES FROM THE FIRST DOCUMENT
304

ASSOCIATE THE FIRST DOCUMENT WITH A FIRST TEMPLATE BASED ON ONE OR MORE EXTRACTED DATA ENTRIES
306

DETERMINE ONE OR MORE DOCUMENT-LEVEL NOTARY REQUIREMENTS
308

IDENTIFY A FIRST SUBSET OF ACTIVE NOTARY DEVICES
310

TRANSMIT A FIRST NOTARY SESSION JOIN REQUEST TO A FIRST SUBSET OF ACTIVE NOTARY DEVICES
312

MEETING ACCEPTANCE WITHIN THRESHOLD?
314

NO

YES

318

IDENTIFY SECOND SUBSET OF ACTIVE NOTARY DEVICES

320

TRANSMIT SECOND NOTARY SESSION JOIN REQUEST

322

INITIATE SECOND NOTARY SESSION BETWEEN SECOND NOTARY DEVICE AND FIRST USER DEVICE

316

INITIATE FIRST NOTARY SESSION BETWEEN FIRST NOTARY DEVICE AND FIRST USER DEVICE

END

Figure 8A:
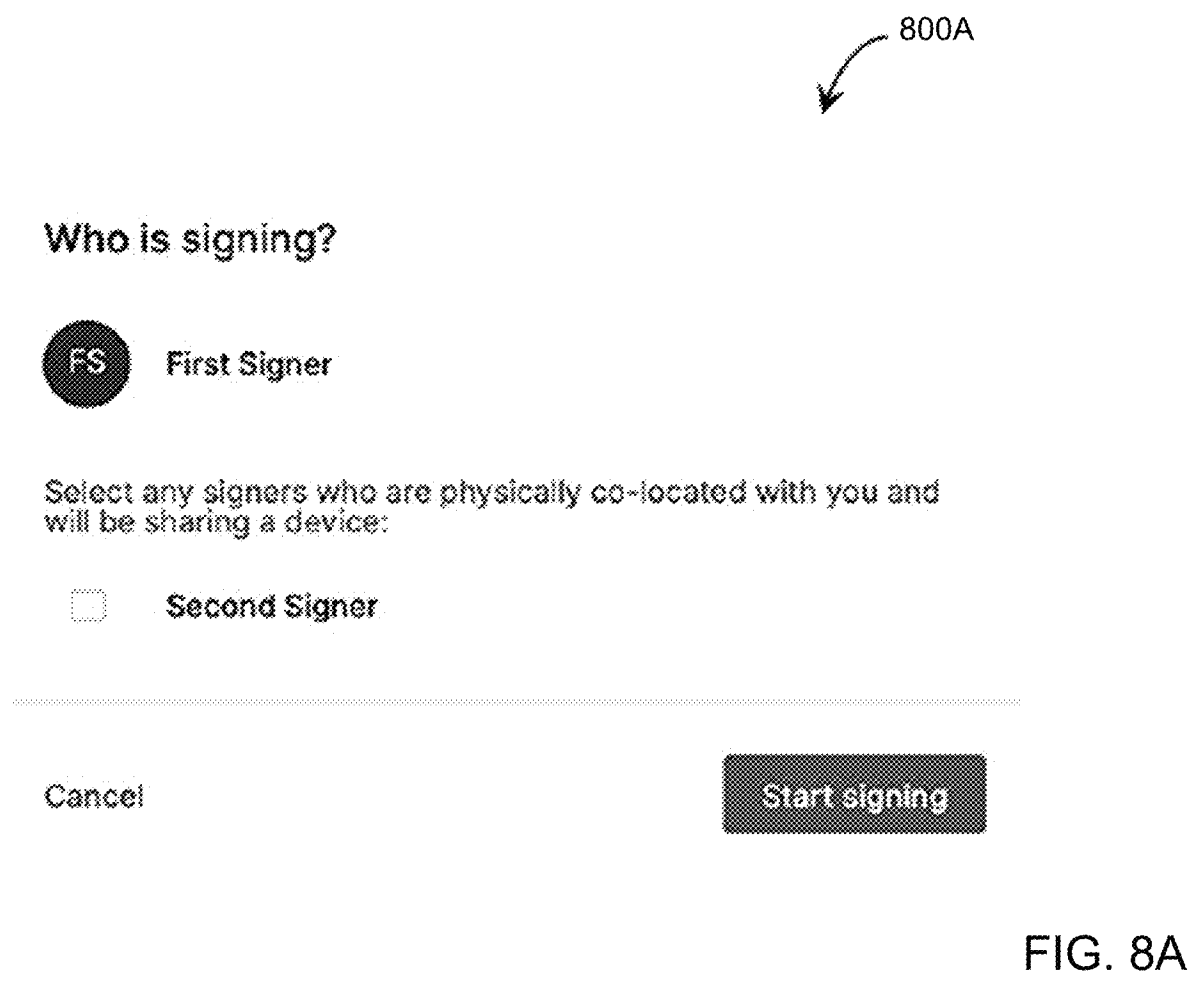

Who is signing?

FS    First Signer

Select any signers who are physically co-located with you and will be sharing a device.

☐    Second Signer

Start signing

Cancel

Waiting for the next available notary

A notary will be available shortly to take your call.

Estimated wait time: Under 2 minutes

DO NOT CLOSE THIS WEBPAGE · To make sure you do not lose your spot.

Audio and video will be recorded as proof of notarization.

Cancel notarization

SYSTEMS AND METHODS FOR DYNAMICALLY PROVIDING NOTARY SESSIONS

CROSS-REFERENCE TO RELATED APPLICATION

This application claims the benefit of U.S. Provisional Application No. 63/307,573, filed Feb. 7, 2022, which is herein incorporated by reference.

FIELD

The disclosed technology relates to systems and methods for dynamically providing notary sessions. Specifically, this disclosed technology relates to systems and methods that receive a document to be notarized, determine notary requirements, and efficiently match a user to a qualified notary based on the notary requirements.

BACKGROUND

Traditionally, notary services were performed in person. People seeking notary services searched for a notary within the area, determined whether the notary is available, and scheduled an in-person meeting to sign documents and had their signature notarized by the notary. Identifying a notary that is qualified to sign the document in question was a burdensome process, requiring the person to review state and federal regulation, agency rules, and find a notary that had the requisite certifications to sign the document.

Recently, several U.S. states have begun to allow remote online notarization. However, it is problematic for current systems and methods to determine notary requirements based on a user-provided document and dynamically route users seeking notary services to notaries that are both qualified and available to provide notary services with a short waiting time.

Accordingly, there is a need for improved systems and methods for dynamically and efficiently providing notary sessions.

SUMMARY

Disclosed embodiments may include a system for dynamically providing communication sessions with trusted agents who perform document verification or management services, such as notarization. The system may include one or more processors, and memory in communication with the one or more processors and storing instructions that, when executed by the one or more processors, are configured to cause the system to dynamically provide such communication sessions. In some embodiments, the communication sessions are with notaries who provide document notarization services, but communication sessions with other trusted agents, such as a trusted referee, document tagger, or closing concierge, may be established using the techniques described herein. For illustrative purposes, many of the various embodiments will be described herein in the context of notarization services, and the communication session will be referred to as "notary sessions." However, it should be emphasized that other types of trusted agent services may be provided in other embodiments.

In an example method, a user can upload a document to the system. The system can extract data entries from the document and use a document classification algorithm to determine a matching template of a plurality of predetermined templates stored on the system. Based on the extracted data entries and the template, the system can determine document-level notary requirements. For example, the system can identify that the document is associated with a state government and requires a notary that is registered in that state. Optionally, the user can specify one or more user-level notary requirements as part of uploading the document. For example, the user may be part of a particular entity, organization, or corporation, and may request that the notary be approved by the entity, organization, or corporation. Based on the one or more document-level requirements and the optional one or more user-level requirements, the system can dynamically filter through all notary devices active within the system and identify a first subset of notary devices that conform to the document-level requirements and the user-level requirements.

Optionally, the system can receive requests from a plurality of users at the same or substantially the same time, and assign a user priority to each user. For example, each user can be assigned a priority based on a dynamic bidding process, in which users with a higher bid for the notary service is offered a higher priority among the plurality of users. Similarly, the system can assign a notary priority to each qualified notary, as will be further explained in the detailed description.

After identifying the first subset of notary devices, the system can transmit a first notary session join request to the first subset of notary devices. If the first notary session join request is accepted by a notary device of the first subset within a first predetermined threshold, the system may initiate a first notary session between the first notary device and the first user device. Optionally, the first user (via first user device) may indicate one or more secondary user devices associated with the notarization, and the system can join the one or more secondary user devices to the first notary session. If the notary session join request is not accepted within the first predetermined threshold, the system may identify a second subset of active notary devices (e.g., by relaxing one or more of the user-level requirements or document-level requirements, by expanding the definition of "available" notary devices by relaxing the estimated wait-time cutoff for available notary devices, etc.) and transmit a second notary session join request. The system may then initiate a second notary session between a second notary device of the second subset of active notary devices, and the user device.

In some examples, the system may track various metrics about notary performance and use the metrics to filter the subset of notary devices or select a specific notary device for a notary session. As an example, such metrics may indicate the proficiency of the notary, familiarity of the notary with the user requesting the notary session, expected notary response time, notary error rate, notary's average session time, notary rating or feedback score from users who have been serviced by the notary, or other metrics indicative of or based on the notary's performance in previous notary sessions.

In some examples, the system can also dynamically rate notaries associated with notary devices based on sentiment analysis. The system may be configured to create a transcript associated with the notary session and utilize a sentiment analysis algorithm to determine a sentiment score for the notary associated with the notary session. Based on the sentiment score, the system may dynamically update a notary score for the respective notary. Optionally, other data can be included in the determination of the notary, for example, certifications that the notary has achieved, notary success rate, notary number of transactions with the system, etc.

Further implementations, features, and aspects of the disclosed technology, and the advantages offered thereby, are described in greater detail hereinafter, and can be understood with reference to the following detailed description, accompanying drawings, and claims.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings:

FIG. 3 is a flow diagram illustrating an exemplary method for dynamically providing notary sessions in accordance with certain embodiments of the disclosed technology.

FIG. 8A shows an illustrative screen 700A for a notary session in accordance with certain embodiments of the disclosed technology.

DETAILED DESCRIPTION

Figure 1:
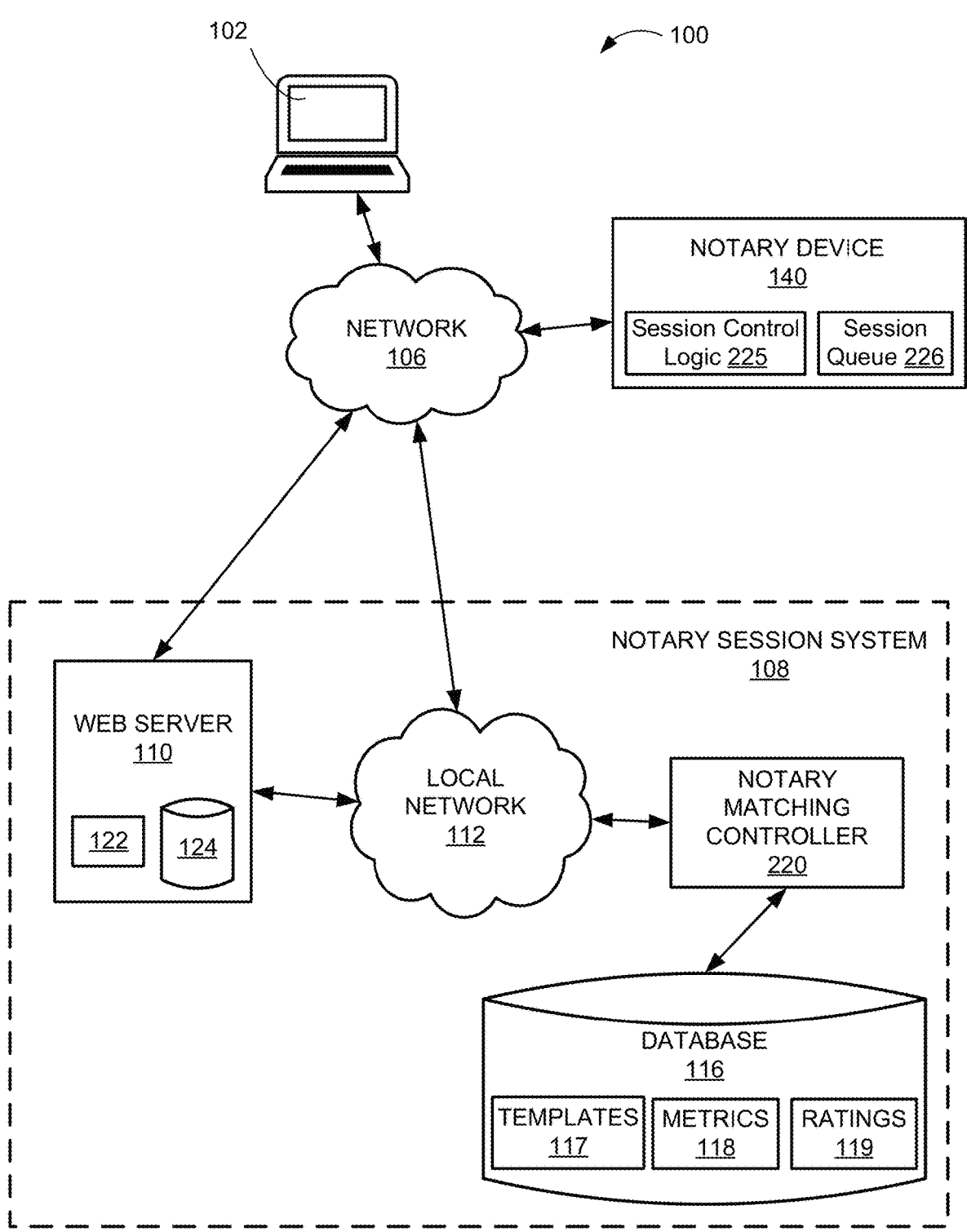
FIG. 1 is block diagram of an example system that may be used to dynamically provide notary sessions, according to an example implementation of the disclosed technology.

Examples of the present disclosure generally relate to systems and methods for dynamically providing notary sessions. More particularly, the disclosed technology relates to matching users requiring document specific notary services with notaries that are qualified to provide the notary service for that type of document. The users and notaries are dynamically connected to a notary meeting in which the notary and the one or more users meet and the notary provides the document specific notary service. In some embodiments, the system is configured to increase system throughput and reduce latency in providing the services by dynamically determining notaries having the low wait times and expanding the pool of available notaries if a user is not connected to a notary within a predetermined time threshold. The systems and methods described herein improve, in some instances, the operation of computers and technology. The present disclosure details how users and notaries are dynamically connected to a notary meeting. This, in some examples, may involve using a notary matching controller to dynamically monitor notary availability based on notary requirements (e.g., document defined and user defined) and pre-existing notary session requests which improves the way the notary session system dynamically connects users to notaries while reducing wait times for the users.

In some embodiments, the present disclosure provides a platform that can dynamically connect users to qualified notaries while reducing latency and wait times. The systems and methods described herein utilize, in some instances, machine learning models that help to optimize or otherwise improve the overall performance of the notary matching including reducing latency and wait times. Machine learning models are a computer technology that involve training models to autonomously complete tasks and make decisions. The present disclosure, in some examples, may involve using document classification input data and a classifier machine learning model, applied to documents uploaded by users to the notary matching controller to improve the ability of the notary matching controller to categorize the type of document and document-level notary requirements for a specific document. Using a machine learning model in this way may allow the system to improve the identification of qualified notaries based on document-specific notary requirements. In some embodiments, the system may automatically identify document-level notary requirements using a classifier model and improve the accuracy of the model based on document classification feedback input data.

As noted above, while the disclosed embodiments refer to notaries and notary devices, it should be understood that the disclosed systems and methods can be implemented to connect users with a variety of other types of "trust agents," which can include, but not be limited to professionals performing services such as notarization services, document tagging services, real estate closing concierge services, trusted referee services, etc.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

FIG. 1 is a block diagram of an example system that may be used to interact with a session management system 108, referred to hereafter for simplicity of illustration as "notary session system," according to an example implementation of the disclosed technology. The components and arrangements shown in FIG. 1 are not intended to limit the disclosed embodiments as the components used to implement the disclosed processes and features may vary. As shown, notary session system 108 may interact with a user device 102 and a computing device 140 via a network 106. The device 140 is used by a trusted agent, such as a notary, and will be referred to hereafter as "notary device" for simplicity of illustration. In certain example implementations, the notary session system 108 may include a local network 112, a controller 220 (referred to hereafter for simplicity of illustration as "notary matching controller," a web server 110, and a database 116 or other type of memory. It should be understood that although FIG. 1 shows a single user device 102 and a single notary device 140 interacting with notary session system 108, there may be a plurality of user devices 102 (e.g., user device 102A, 102B, . . . , 102N, etc.) and a plurality of notary devices 140 (e.g., notary device 140A, 140B, . . . , 140N, etc.) in communication with notary session system 108.

It should be understood that in some examples, a user may be associated with more than one user device 102. Notary session system 108 may determine a user associated with each user device 102 based on a unique identifier for each user. For example, each user may use a unique username and password combination to become associated with one or more user devices 102. Notary session system 108 may store the unique identifier of each user (e.g., on database 116 and/or database 260 as described below) and use the unique identifier to track a user's identity within the system.

In some embodiments, a user may operate the user device 102. The user device 102 can include one or more of a mobile device, smart phone, general purpose computer, tablet computer, laptop computer, telephone, public switched telephone network (PSTN) landline, smart wearable device, voice command device, other mobile computing device, or any other device capable of communicating with the network 106 and ultimately communicating with one or more components of the notary session system 108. In some embodiments, the user device 102 may include or incorporate electronic communication devices for hearing or vision impaired users.

Users may include individuals or an organization/entity seeking to receive notary services from notary session system 108. According to some embodiments, the user device 102 may include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors.

In some embodiments, a notary or other trusted agent may operate the notary device 140. The notary device 140 can include one or more of a mobile device, smart phone, general purpose computer, tablet computer, laptop computer, telephone, public switched telephone network (PSTN) landline, smart wearable device, voice command device, other mobile computing device, or any other device capable of communicating with the network 106 and ultimately communicating with one or more components of the notary session system 108. Notaries can include individuals with the requisite credentials to be qualified to notarize documents that require notarization of signatures. It should be understood that in some examples, a notary may be associated with more than one notary device 140. Notary session system 108 may determine a notary associated with each notary device 140 based on a unique identifier for each user. For example, each notary may use a unique username and password combination to become associated with one or more notary devices 140. Notary session system 108 may store the unique identifier of each notary (e.g., on database 116 and/or database 260 as described below) and use the unique identifier to track a notary's identity within the system. In some examples, and as described in more detail with respect to FIGS. 3-4, a notary may receive a notary session join request on a first notary device (e.g., notary device 140A) but may use a second notary device (e.g., notary device 140B) to initiate a notary session. In a non-limiting example, the first notary device (e.g. notary device 140A) may be a mobile device such as a mobile phone, and the second device may (e.g., notary device 140B) be a desktop or laptop computer.

The network 106 may be of any suitable type, including individual connections via the internet such as cellular or WiFi networks. In some embodiments, the network 106 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

The network 106 may include any type of computer networking arrangement used to exchange data. For example, the network 106 may be the Internet, a private data network, virtual private network (VPN) using a public network, and/or other suitable connection(s) that enable(s) components in the system 100 environment to send and receive information between the components of the system 100. The network 106 may also include a PSTN and/or a wireless network.

The notary session system 108 may be associated with entities such as a business, corporation, individual, partnership, or any other entity that provides notary or other trusted agent services to users. The notary session system 108 may include one or more servers and computer systems for performing one or more functions associated with the notary services that the notary session system 108 provides.

Web server 110 may include a computer system configured to generate and provide one or more websites accessible to customers, as well as any other individuals involved in access system 108's normal operations. Web server 110 may include a computer system configured to receive communications from user device 102 via for example, a mobile application, a chat program, an instant messaging program, a voice-to-text program, an SMS message, email, or any other type or format of written or electronic communication. Web server 110 may have one or more processors 122 and one or more web server databases 124 or other type of memory, which may be any suitable repository of website data. Information stored in web server 110 may be accessed (e.g., retrieved, updated, and added to) via local network 112 and/or network 106 by one or more devices or systems of system 100. In some embodiments, web server 110 may host websites or applications that may be accessed by the user device 102 and notary device 140. For example, web server 110 may host a communication session, referred to hereafter for simplicity of illustrations as "notary session," in which one or more users are matched with a qualified notary or other trusted agent. Web server 110 can be configured to facilitate a video streaming component to the notary session that allows the one or more users and notary to communicate with one another and see each other via a video feed. Web server 110 can also be configured to provide a view of a document to be notarized to both the user (via user device 102) and the notary (via notary device 140) that allows the user to e-sign the document and the notary to notarize the e-signature within the notary session. The web server 110 may also be hosted by an online provider of website hosting, networking, cloud, or backup services, such as Microsoft Azure™ or Amazon Web Services™.

The local network 112 may include any type of computer networking arrangement used to exchange data in a localized area, such as WiFi, Bluetooth™, Ethernet, and other suitable network connections that enable components of the notary session system 108 to interact with one another and to connect to the network 106 for interacting with components in the system 100 environment. In some embodiments, the local network 112 may include an interface for communicating with or linking to the network 106. In other embodiments, certain components of the notary session system 108 may communicate via the network 106, without a separate local network 112.

In accordance with certain example implementations of the disclosed technology, the notary session system 108 may include one or more computer systems configured to gather data from a plurality of sources including the notary matching controller 220, web server 110, and/or the database 116. The notary matching controller 220 can correlate the collected data, analyze the collected data, arrange the collected data, generate derived data based on the compiled data, and store the compiled and derived data in a database such as the database 116. According to some embodiments, the database 116 may store information relating to notary sessions, such as details related to the classification of documents uploaded to the notary session system 108 by a user device 102 and/or notary rating data associated with each participating notary via notary device 140.

Database 116 can be configured to store document templates 117. In some examples, document templates 117 can be user defined (e.g., via an associated user device 102) and can include associated document-level notary requirements, which can be specified by a user (e.g., via an associated user device 102) when creating a document template. Each document template can be associated with a type of document to be notarized and specify one or more document-level requirements for notarization (e.g., requirement to which a notary is required to conform) of the associated document type. For example, a document template 117 can be created for a New York state government form. The form may be required to be notarized by a notary that is licensed by the state of New York. Accordingly, the document template 117 for the New York state government form can include the document-level notary requirement that the form is to be notarized by licensed notary in New York. Note that the databases described herein are exemplary types of memory that may be used to store information, and other types of memory may be used to implement any of the databases described herein, including at least the databases 116, 124, and 260.

Each template 117 may also include data that can be used to determine whether a document matches the document type that is associated with the template 117. As an example, the template 117 may include data indicating the format that a document of the associated document type is expected to have. The data may also include certain keywords (e.g., a document title) that may be included in the document. Thus, a particular document may be analyzed and compared to a template 117 in order to determine whether it matches the document type that is associated with the template 117. If such a match is determined, then the notarization requirements specified by the template 117 may be used to select a suitable notary device 140 for notarizing the document, as will be described in more detail hereafter. In other embodiments, other techniques for determining whether a document matches a template 117 are possible. As an example, as described in more detail below, hashing may be used to determine similarity between a document and a template 117.

Database 116 can also be configured to store metrics 118, referred to hereafter for simplicity of illustration as "notary metrics," for each notary device 140 associated with notary session system 108. Notary metrics 118 can include metrics that are associated with a user (e.g., notary) of the notary device 140 and indicate how the notary has performed in previous notary sessions in which the notary notarized at least one document. As an example, the notary metrics 118 may include average session time. For a given notary session, the session time can be understood as the time that elapsed between the start of the notary session and the end of the notary session. For each notary session performed by the notary of a given notary device 140, the notary matching controller 220 can determine the session time. The notary matching controller 220 can also average the session times for a plurality of notary sessions by the same notary and store the notary's average session time on database 116.

Notary metrics 118 can also include success rate for a respective notary device 140. For each notary session performed by a notary of a respective notary device 140, the notary matching controller 220 can monitor whether the notary has successfully completed a notary service (e.g., notarization, jurat, etc.) prior to the notary session coming to an end. For example, since the notary session is hosted by the web server 110, the notary matching controller 220 can communicate with the web server 110 to monitor the session and, specifically, access the documents that are delivered during the session. When the controller 220 determines that fully notarized document is delivered, the controller 220 may deem the notary session to be successful for the purpose of calculating the notary's success rate. For a plurality of notary sessions performed by the notary of a notary device 140, the notary matching controller 220 can calculate and store the notary success rate, which can be the number of notary sessions performed by the notary for which a notarization was successfully completed divided the total number of notary sessions monitored for the notary.

In some examples, the notary metrics 118 can include a familiarity metric indicating how familiar a notary of a notary device 140 is with a respective user of a user device 102. For example, the notary matching controller 220 may store (e.g., in database 116 and/or database 260) a number of completed notary sessions associated with each user device 102. Accordingly, notary matching system 220 may track familiarity of each notary for each user. The familiarity metric can be determined based on the number of completed notary sessions of each notary for each user.

In some examples, notary metrics 118 may include notary qualifications for each notary associated with a notary device 140. Notary qualifications may include an indication of each state or entity with which a notary of a respective notary device is associated. For example, notary matching controller may store information indicating that a notary is registered in the states of New York and New Jersey. In some examples, notary matching controller 220 may use stored notary qualifications to efficiently match users within a respective state or having a document associated with a respective state to notaries that are recognized/registered by the same state. Notary qualifications may include an indication of an association or professional group that a notary using notary device 140 is a member of. For example, notary matching controller 220 may be configured to store information (e.g., on database 116, 260, etc.) indicating that a notary is a member of a notary association, such as the National Notary Association (NNA).

In some examples, notary metrics 118 can include languages in which a notary using notary device 140 is proficient. For example, a notary may be able to specify to notary session system 108 one or more languages in which they are proficient. In some examples, the notary may be required to upload proof of proficiency for each selected language before being qualified by notary session system 108 to provide services in a respective language. For example, notary session system 108 may be configured to store results of a language proficiency exam on database 116 or database 260, and notary session system 108 may require a result that exceeds a predetermined threshold on a standardized scale before allowing a notary to provide services in that language. In some examples, standardized language scales can include, but not be limited to, the CEFR scale, the ACTFL scale, and the ILR scale.

In some examples, notary metrics 118 may also include information indicating whether a notary of a notary device has completed or satisfied certain user-level notary requirements. A user-level notary requirements can be understood as any criteria that a user of a user device can require of a notary associated with a notary device, thereby influencing notary matching controller 220 to match users to notaries that satisfy user-level notary requirements specified by a respective user. A user-level notary requirement can be based on any notary metric 118 and/or notary rating 119 (as described below) stored by notary matching controller 220. For example, a user-level notary requirement can be a requirement that a notary complete a user-specified notary certification or training course. For each respective notary, the notary matching controller 220 can store on database 116 or database 260 information indicating which certification and/or training courses that the respective notary has completed. Similarly, a user-level notary requirement can be that a notary is a member of a particular association or professional group, such as the NNA. For each respective notary, the notary matching controller can store on database 116 or database 260 information indicating one or more professional groups that a notary is a member of. As another example of a user-level notary requirement, a user can specify that he or she wishes to be matched to a notary within a particular time zone, for example, the same time zone as the user occupies, or a time zone within a threshold of similarity to the time zone that the user occupies. For example, a user within the central time zone may specify that he or she wishes to be matched to a notary within the central time zone, or a time zone within one hour of the central time zone, such as the central time zone, mountain time zone, and eastern time zone. As another example of a user-level notary requirement, a user may specify a notary be proficient in a particular language as explained above. For example, a user may request a notary that is proficient in Spanish.

In some examples, notary metrics 118 may include user feedback indicating how well a given notary performed in notarization sessions from the perspective of users of user devices 102 who have used the notary's services. To determine such information, the notary matching controller 220 may receive user feedback (e.g., from a user device 102) after completion of a notary service with a notary (e.g., via notary device 140) and store the user feedback on database 116 as a notary metric 118. In some examples, user feedback can be received in the form of a customer satisfaction score (CSAT). As an example, the notary matching controller 220 may prompt the user to provide an input (e.g., a number on a rating scale, such a as a ten point scale with "1" being worst and "10" being best) indicating how satisfied the user is with the services performed by the notary. In some examples user feedback can be in the form of a written user review in which the user may provide a summary of the user experience, which may also be stored on database 116.

Notary matching controller 220 can also be configured to calculate notary ratings 119 for each notary and store notary ratings on database 119. A notary rating for a given notary generally refers to an assessment of how well the notary has performed according to one or more metrics tracked by the notary matching controller 220. Notary ratings 119 can be determined based on one or more of the notary metrics 118 stored in the database 116 though it is possible to use other metrics, if desired. In some examples, a higher notary rating 119 can indicate that a respective notary has performed better in providing notary services than a notary having a lower notary rating 119. Notary rating 119 may be dynamically updated after each notary session for a respective notary. For example, if a notary completes a notary session quickly and reduces his or her average session time, notary matching controller 220 may dynamically increase notary rating 119 for the respective notary. In some examples, after the respective notary completes a notary session, the user may provide favorable feedback which may be stored as a notary metric 118 on database 116 by notary matching controller 220. In response notary matching controller 220 may dynamically increase notary rating 119 for the respective notary. Similarly, when a respective notary completes a certification or training course and uploads proof of completion to notary matching controller 220 which may be stored as notary metric 118, notary matching controller 220 may dynamically increase notary rating 119 for the respective notary. Similarly, notary matching controller 220 can dynamically decrease a notary rating based on negative user feedback and/or an increased average session time. It should be understood that notary metrics 118 are not limited to these examples, and that any number of metrics may be used by notary matching controller to determine a notary rating 119.

In some examples, notary ratings 119 may include a proficiency metric indicating whether a notary of a notary device 140 is proficient with a particular document type. For example, the document type can be determined based on the template 117 that the document is associated with as may be determined by notary matching controller 220. The notary matching controller 220 may determine the proficiency metric by identifying how many times a notary using notary device has successfully completed a notary session for documents having a respective associated template 117 or of a certain document type or category.

It should be understood that database 260 of notary matching controller 220 may be configured to store data and information that is stored on database 116. In some examples, the database 116 may also serve as a back-up storage device and contain data and information that is also stored on, for example, database 260, as discussed with reference to FIG. 2.

Although the preceding description describes various functions of a web server 110, a notary matching controller 220, and a database 116, in some embodiments, some or all of these functions may be carried out by a single computing device.

Figure 2:
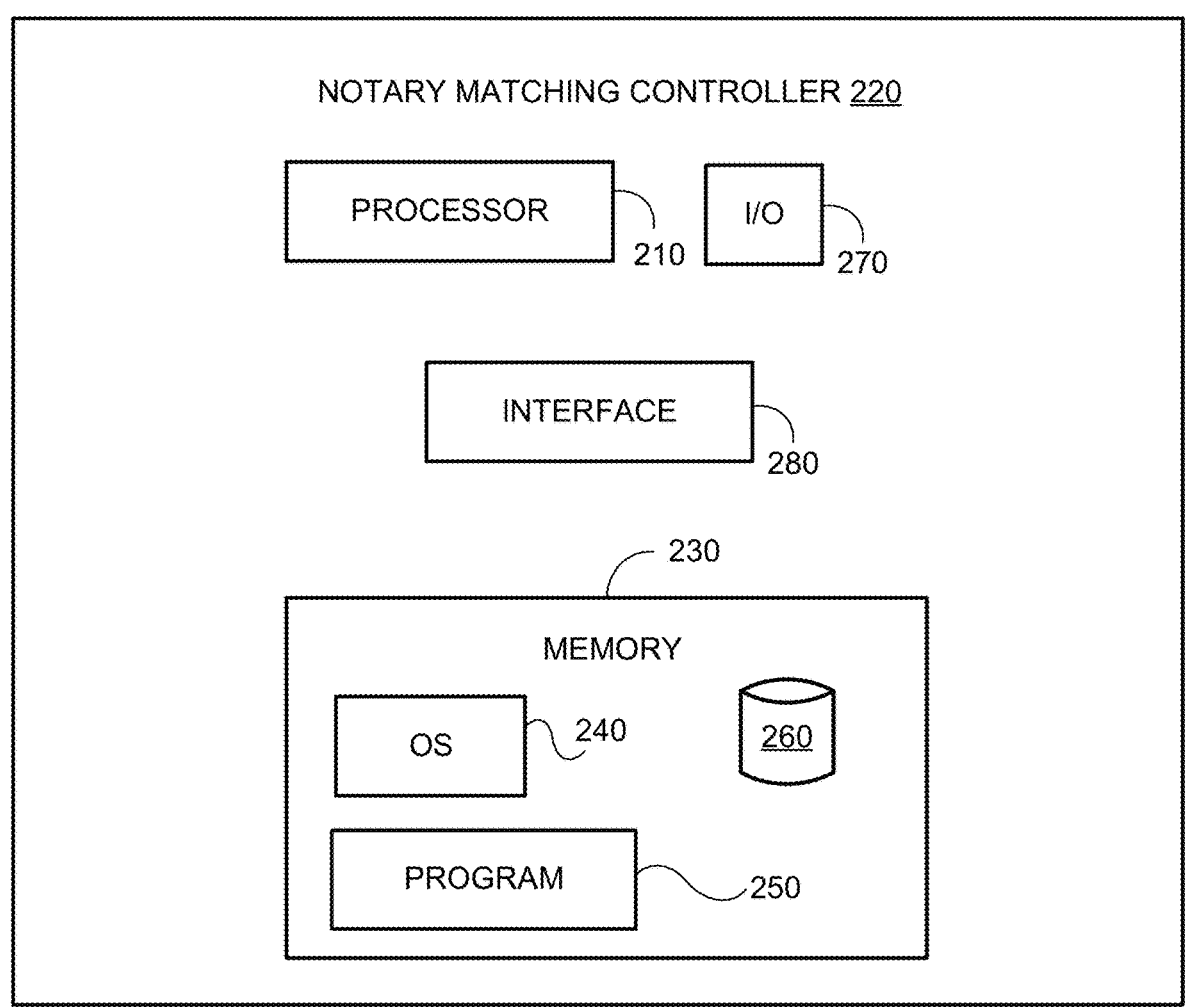
FIG. 2 is block diagram of an example notary matching controller used to dynamically provide notary sessions, according to an example implementation of the disclosed technology.

FIG. 2 is a block diagram of an example notary matching controller 220 used to receive a document from a user device, determine notary requirements based on the received document, and match a user device with a qualified notary device 140 based on the determined notary requirements, according to an example implementation of the disclosed technology. It should be understood that notary matching controller 220 may be implemented in hardware, in software, in firmware, and/or in combinations thereof. According to some embodiments, the user device 102 and web server 110, as depicted in FIG. 1, may have a similar structure and components that are similar to those described with respect to notary matching controller 220 shown in FIG. 2. As shown, the notary matching controller 220 may include a processor 210, an input/output (I/O) device 270, a memory 230 containing an operating system (OS) 240 and a program 250. In certain example implementations, the notary matching controller 220 may be a single server or may be configured as a distributed computer system including multiple servers or computers that interoperate to perform one or more of the processes and functionalities associated with the disclosed embodiments. In some embodiments notary matching controller 220 may be one or more servers from a serverless or scaling server system. In some embodiments, the notary matching controller 220 may further include a peripheral interface, a transceiver, a mobile network interface in communication with the processor 210, a bus configured to facilitate communication between the various components of the notary matching controller 220, and a power source configured to power one or more components of the notary matching controller 220.

Interface 280 may include the hardware, firmware, and/or software that enable communication with peripheral devices, such as media drives (e.g., magnetic disk, solid state, or optical disk drives), other processing devices, or any other input source used in connection with the disclosed technology. Examples of such interfaces include serial ports, parallel ports, general-purpose input and output (GPIO) ports, game ports, universal serial bus (USB) ports, micro-USB ports, high-definition multimedia interface (HDMI) ports, video ports, audio ports, Bluetooth™ ports, near-field communication (NFC) ports, other similar communication interfaces, or any combination thereof.

Interface 280 interface may provide access to a cellular network, the Internet, or another wide-area or local area network. In some embodiments, the interface 280 comprises a transceiver (e.g., a cellular transceiver) that is configured to communicate with the network 106.

The processor 210 may include one or more of a microprocessor, microcontroller, digital signal processor, co-processor or the like or combinations thereof capable of executing stored instructions and operating upon stored data. The memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 230.

The processor 210 may be one or more known processing devices, such as, but not limited to, a microprocessor from the Core™ family manufactured by Intel™, the Ryzen™ family manufactured by AMD™, or a system-on-chip processor using an ARM™ or other similar architecture. The processor 210 may constitute a single core or multiple core processor that executes parallel processes simultaneously, a central processing unit (CPU), an accelerated processing unit (APU), a graphics processing unit (GPU), a microcontroller, a digital signal processor (DSP), a field-programmable gate array (FPGA), an application-specific integrated circuit (ASIC) or another type of processing component. For example, the processor 210 may be a single core processor that is configured with virtual processing technologies. In certain embodiments, the processor 210 may use logical processors to simultaneously execute and control multiple processes. The processor 210 may implement virtual machine (VM) technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the notary matching controller 220 may include one or more storage devices configured to store information used by the processor 210 (or other components) to perform certain functions related to the disclosed embodiments. In one example, the notary matching controller 220 may include the memory 230 that includes instructions to enable the processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

The notary matching controller 220 may include a memory 230 that includes instructions that, when executed by the processor 210, perform one or more processes consistent with the functionalities disclosed herein. Methods, systems, and articles of manufacture consistent with disclosed embodiments are not limited to separate programs or computers configured to perform dedicated tasks. For example, the notary matching controller 220 may include the memory 230 that may include one or more programs 250 to perform one or more functions of the disclosed embodiments. For example, in some embodiments, the notary matching controller 220 may classify documents, determine notary requirements, and determine notary ratings via one or more programs 250.

The processor 210 may execute one or more programs 250 located remotely from the notary matching controller 220. For example, the notary matching controller 220 may access one or more remote programs that, when executed, perform functions related to disclosed embodiments.

The memory 230 may include one or more memory devices that store data and instructions used to perform one or more features of the disclosed embodiments. The memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, Postgresql™, Redis™, or other relational or non-relational databases. The memory 230 may include software components that, when executed by the processor 210, perform one or more processes consistent with the disclosed embodiments. In some embodiments, the memory 230 may include a notary matching controller database 260 for storing related data to enable the notary matching controller 220 to perform one or more of the processes and functionalities associated with the disclosed embodiments.

The notary matching controller database 260 may include stored data relating to notary sessions as described with respect to database 116 (e.g., average session duration data, location data, idle time between sessions, and/or average idle time between sessions). The notary matching controller database 260 may also include stored data relating to document classification and notary ratings. According to some embodiments, the functions provided by the notary matching controller database 260 may also be provided by a database that is external to the notary matching controller 220, such as the database 116 as shown in FIG. 1. As noted above, other types of memory may be used in place of the notary matching controller database 260 and/or other databases described herein, if desired.

The notary matching controller 220 may also be communicatively connected to one or more memory devices (e.g., databases) locally or through a network. The remote memory devices may be configured to store information and may be accessed and/or managed by the notary matching controller 220. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The notary matching controller 220 may also include one or more I/O devices 270 that may comprise one or more interfaces for receiving signals or input from devices and providing signals or output to one or more devices that allow data to be received and/or transmitted by the notary matching controller 220. For example, the notary matching controller 220 may include interface components, which may provide interfaces to one or more input devices, such as one or more keyboards, mouse devices, touch screens, track pads, trackballs, scroll wheels, digital cameras, microphones, sensors, graphical display monitors, and the like, that enable the notary matching controller 220 to receive and present data to a user (such as, for example, via the user device 102).

In examples of the disclosed technology, the notary matching controller 220 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

The notary matching controller 220 may include programs that train, implement, store, receive, retrieve, and/or transmit one or more machine learning models. Examples of such models may include, but not be limited to, a neural network model, a generative adversarial network model (GAN), a recurrent neural network (RNN) model, a deep learning model (e.g., a long short-term memory (LSTM) model), a random forest model, a convolutional neural network (CNN) model, a support vector machine (SVM) model, logistic regression, XGBoost, a bidirectional neural network, or any other machine learning model. The machine learning models may also include an ensemble model consisting of a plurality of models. Training of a model may be terminated when a training criterion is met, such as a number of epochs, a training time, a performance metric (e.g., an estimate of accuracy in reproducing test data), etc. During training, the notary matching controller 220 may also adjust model parameters, such as weights, coefficients, offsets, etc. Training of the machine learning models may be supervised or unsupervised.

The notary matching controller 220 may be configured to train machine learning models by optimizing model parameters and/or hyperparameters (e.g., hyperparameter tuning) using an optimization technique, consistent with disclosed embodiments. Hyperparameters may include training hyperparameters, which may affect how training of the model occurs, or architectural hyperparameters, which may affect the structure of the model. An optimization technique may include, but not be limited to, a grid search, a random search, a gaussian process, a Bayesian process, a Covariance Matrix Adaptation Evolution Strategy (CMA-ES), a derivative-based search, a stochastic hill-climb, a neighborhood search, an adaptive random search, or the like. The notary matching controller 220 may be configured to optimize statistical models using known optimization techniques.

In some embodiments, notary matching controller 220 may be configured to generate a similarity metric representing a measure of similarity between data extracted from an uploaded document to be notarized and one or more predetermined document templates. A similarity metric may be based on a correlation, covariance matrix, a variance, a frequency of overlapping values, a cosine similarity, Euclidean distance, a dot product, or other measure of statistical similarity.

While the notary matching controller 220 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the notary matching controller 220 may include a greater or lesser number of components than those illustrated.

In some examples, notary matching controller 220 can be configured to receive documents (e.g., documents to be notarized) and extract data entries from the documents. Data entries can be numbers, words, and/or word phrases that are found within the uploaded document. These data entries can be extracted by notary matching controller 220 and compared to document templates (e.g., document templates 117) to determine a most similar document template 117. For example, notary matching controller 220 can generate a similarity score between the received document and the each stored document templates 117. The similarity score general indicates whether and/or the likelihood that the document matches the document type associated with the template. As an example, a higher similarity score may indicate that the document is more similar to the type of document associated with the template. The notary matching controller 220 may be configured to associate the received document with the document template 117 with the highest similarity score. That is, the received document may be determined to match the document template 117 with the highest similarity score, and the matching template 117 may thereafter be used to select a suitable notary device 140 for use in notarizing the documents, as described in more detail herein. In some examples, the similarity score can be determined by utilizing a machine learning algorithm that may vectorize the one or more extractable data entries and vectorize each document template. A technique such as Euclidean distance, cosine similarity, dot product, etc. may be used to determine each similarity score.

In some examples, notary matching controller 220 may standardize a received document based on the matching document template 117. For example, a data entry from or in the document may include a social security number in the form of XXXXXXXXX. However, the matching document template 117 may include a similar data entry for a social security number with hyphens between digits of the number, such as XXX-XX-XXXX. Accordingly, notary matching controller 220 may modify the data entry to conform to the matching document template 117. In another example, the notary matching controller 220 can determine that a data entry within the document is abbreviated while the corresponding term within the matching document template 117 is not abbreviated. Accordingly, notary matching controller 220 may change the abbreviated data entry to conform to the matching document template 117.

In some examples, notary matching controller 220 may be configured to select a notary device 140 from a plurality of notary devices 140 connected to the network 106 for use in electronically notarizing a document received from a user device 102. In this regard, after matching the document from the user device 102 with a document template 117, as described above, the notary matching controller 220 may be configured to identify a group of notary devices 140 associated with notaries that satisfy user-level requirements and document-level requirements associated with the document. Document-level notary requirements can be determined based on the type and content of the document to be notarized. For example, as indicated above, the matching template 117 may specify requirements, such as the state in which a notary must be licensed or which certifications or training courses a notary must have completed in order to notarize the document from the user device 102. The notary matching controller 220 may be configured to use information stored the database 116 about the notaries of the notary devices 104 to determine whether the document-level requirements are satisfied, if such information is included in the database 116. The notary matching controller 220 may also be configured to communicate with the notary devices 140 to make such determinations. As an example, each notary device 140 may be configured to store information associated with a notary of the respective device 140 and indicating which requirements are satisfied by the notary. In other embodiments, other techniques may be used to determine whether the document-level requirements are satisfied.

User-level notary requirements may be specified by a user as part of a notary session. For example, a user may specify that a notary be pre-approved by the employer of the user. The notary matching controller 220 may be configured to determine which notary devices 140 are associated with notaries that satisfy the user-level notary requirements using the same techniques described above for determining which notary devices 140 are associated with notaries that satisfy the document-level requirements. Thus, the notary matching controller 220 effectively filters the notary devices 140 to find a group of notary devices 140 associated with notaries who are qualified to notarize the document (i.e., who satisfy the document-level requirements and the user-level requirements associated with the document to be notarized). From the identified group of notary devices 140 associated with qualified notaries, the notary matching controller 220 selects a notary device 140 for use in notarizing the document and connects such notary device 140 with the user device 102 from which the document was received so that the document can be notarized by the notary of the selected notary device 140, as will be described in more detail below. As noted above, such connection may be established by hosting a notary session at the web server 110 and connecting the notary device 140 and the user device 102 to the notary session.

As shown by FIG. 1, each notary device 140 may comprise session control logic 225 and a session queue 226. The session control logic 225 may be configured to control various aspects of notary session management. As an example, the session control logic 225 may be configured to communicate various types of control information with the notary matching controller 220. For example, the session control logic 225 may inform the notary matching controller 220 when the notary device 140 is online, and the notary matching controller 220 may use this information when selecting notary devices 140 for a given notary session, as described herein. Note that the session control logic 225 may be implemented in hardware, software, or any combination thereof. In some embodiments, the session control logic 225 is implemented in software and stored in memory of the notary device 140 for execution by at least one processor (not shown) of the notary device 140.

The session queue 226 is configured to store requests from the notary matching controller 220, referred to herein as "notary session join requests." Each notary session join request is a request, also referred to herein as an "invitation," for the notary device 140 to join a respective notary session for which the notary device 140 has been selected by the notary matching controller 220. In this regard, when the notary matching controller 220 selects a notary device 140 for use in a notary session, the controller 220 may transmit a notary session join request to the selected notary device 140. In response, the notary device 140 may add the notary session join request to its session queue 226. Thus, the session queue 226 indicates a list of notary sessions currently assigned to the notary device 140. Note that the information in the session queue 226 may include sufficient information for the notary device 140 to initiate the notary session, such as an IP address or other information to be used to establish communication with the user device 102 associated with the notary session or the web server 110.

When the notary of the notary device 140 is ready to join a notary session, the session control logic 225 is configured to pull the next notary session join request from the session queue 226 on a first-in, first-out (FIFO) basis and attempt to join the notary session indicate by such request. Pulling of the notary session join request from the session queue 226 removes such join request from the queue 226 such that the next time the session control logic 225 attempts to pull a join request from the queue 226, a new notary session join request should be pulled. Thus, the session queue 226 indicates the current number of uncompleted notary sessions currently assigned to the notary device 140, and this information may be used to estimate a wait time or the notary device 140, as will be described in more detail below.

Note that for a given notary session, the notary matching controller 220 may select a single notary device 140 for the session (e.g., a notary device associated with a qualified notary who is prioritized over other qualified notaries based on one or more metrics tracked by the notary matching controller 220, as described further below) or multiple notary devices 140 (e.g., a subset of notary devices associated with qualified notaries who are prioritized higher than other qualified notaries based on one or more metrics tracked by the notary matching controller 220, as described further below). If a single notary device 140 is selected, the notary matching controller 220 transmits a notary session join request to the selected notary device 140. If the selected notary device 140 does not join the notary session within a predefined amount of time, the notary matching controller 220 may select another notary device 140 (e.g., the next highest prioritized notary device 140) and send a join request for the session to such newly selected notary device 140.

If multiple notary devices 140 are selected as candidates for servicing a notary session, the notary matching controller 220 may send a notary session join request to each such notary device 140. As noted above, if one of these selected notary devices 140 does not join the notary session within a predefined time period, the notary matching controller 220 may relax the requirements for qualified notaries so that additional notary devices 140 may receive a join request for the notary session, thereby likely reducing the amount of time before one of the candidate notary devices 140 joins the notary session.

In any event, whether the notary matching controller 220 invites notary devices 140 to a notary session one at a time or in batches, there may be multiple notary devices 140 that have received a notary session join request for the same notary session. When the first candidate notary device attempts to join the notary session, the notary matching controller 220 may be configured to permit such notary device 140 to join the session so that the notary associated with such notary device 140 may provide notarization services as described herein. Thereafter, if the notary matching controller 220 receives additional attempts by other notary devices 140 to join the notary session, the notary matching controller 220 may deny such notary devices 140 access to the notary session since another notary device 140 has already joined. In such case, each such other notary device 140 that has been denied access may simply pull the next notary session join request from its session queue 226 and attempt to join the notary session indicated by this next session joint request. In some embodiments, once a notary device 140 is permitted to join a notary session, the notary matching controller 220 may be configured to communicate with the session control logic 225 of the other notary devices 140 that have been invited to the same notary session to inform such session control logic 225 that the notary session is no longer available. In response, the session control logic 225 may remove the notary session join request indicative of such notary session from its respective session queue 226 so that the session queue 226 better reflects the total number of available sessions to which the notary device 140 has been invited.

As noted above, there are various techniques may be used by the notary matching controller 220 in order to determine which qualified notary should be selected or prioritized for a particular document or notary session. In some embodiments, the notary matching controller 220 may compare the metrics 118 and ratings 119 associated with different qualified notaries and optimize the selection of the qualified notary according to a desired algorithm for notary selection. As an example, the algorithm may be designed such that notaries associated with higher or better metrics 118 or ratings 119 are more likely to be selected. As an example, a notary having better ratings 119, lower average session time, and higher notary success rate may have a higher likelihood of being selected. In some embodiments, the factors used for notary selection may be weighted in order to give greater importance to at least some factors.

In some examples, the notary matching controller 220 may be configured to rank the notary devices 140 of the qualified notaries based on the metrics 118 and ratings 119. For example, the notary devices 140 of qualified notaries found to be more suited for selection based on the factors mentioned above may be ranked higher (e.g., assigned a higher priority). The notary matching controller 220 may also communicate with the notary devices 140 to determine which devices 140 are currently available or at least are expected to be available within a certain time frame (as described in more detail below) and select the highest-ranked notary device 140 that is available or expected to be available within a certain time frame (e.g., within 5 minutes or some other time period).

It should be noted that, in some examples, multiple users needing notarization of separate documents may share a single user device 102 when the users are collocated. In other examples, multiple user devices 102 (e.g., user device 102A, 102B, etc.) may be connected to the same notary session with a notary device 140. For example, a first user device 102A may identify a second user device 102B to be connected to the same notary session as the first notary device 102A. Notary matching controller 220 may subsequently connect both first user device 102A and second user device 102B to the appropriate notary device 140.

In some embodiments, runtime conditions, such as expected wait time for a notary device 140 to join a notary session, may be used by notary matching controller 220 in selecting a notary device 140 for a given notary session. Estimation of an expected wait times may be based on various factors, including a number of notary sessions currently assigned to each respective notary device 140. For example, in some embodiments, the notary matching controller 220 may be configured to communicate with a notary device 140 to determine the number of notary sessions currently in its queue and, based on such number, estimate an expected wait time for the notary device 140 to complete its queued sessions. As an example, using the average session time correlated with the notary device 140 in the metrics 118, the notary matching controller 220 may estimate the expected wait time by multiplying the device's average session time by the number of queued sessions. The notary matching controller 220 may then use the expected wait time as a factor in deciding whether it selects the notary device 140 for the current notary session being assigned, as described above. In other embodiments, other techniques for estimating the expected wait time are possible.

In some examples, the qualifications for a suitable notary may be relaxed if a suitable notary device 140 is not available for a notary session within a certain amount of time (e.g., five minutes or some other time period). In some cases, the time threshold for determining when to relax qualifications may be predefined or may be specified by a user of the user device 102 requesting a notary session. Relaxing the qualifications should increase the number of notary devices 140 in the pool that satisfy the session requirements, thereby likely reducing the time that at least one of the notary devices 140 of qualified notaries will become available. As an example, one or more original requirements for a notary session being assigned, such as a notary completing a certain training course or achieving a certain certification, may be removed such that a greater number of notaries likely qualify for the notary session. In some embodiments, notary qualifications may be relaxed based on expected wait times (e.g., when the expected wait times for qualified notaries exceeds a time threshold) or after a certain amount of time after the notary session has been assigned. For example, if a notary session is assigned to a particular notary device 140 and if a certain amount of time elapses without the notary device 140 initiating the notary session, the notary matching controller 220 may relax the qualifications and select a new notary device 140 associated with a shorter expected wait time. The controller 220 may then send a notary session join request to the new notary device 140. In some examples, only certain notary requirements may be relaxed by the notary matching controller 220 while others notary requirements may not be relaxed. For example, document-level notary requirements that are associated with the document (e.g., notary state requirements, notary certification by a certain governmental body, etc.) to be notarized may not be relaxed, while user-level notary requirements specified by a user requesting a notary service (e.g., time zone of a notary, notary preapproved by a user, etc.) may be considered optional and may be relaxed to expand the available pool of notary devices 140.

Note that it is possible for the notary matching controller 220 to maintain the session queues described above as being maintained by the notary devices 140 such that communication with the notary devices 140 to estimate expected wait times is unnecessary. However, maintaining the session queues at the notary devices 140 may help to increase the accuracy of the expected wait times. In this regard, the session queues at the notary devices 140 may include sessions that have been assigned by third-party systems such that the queues at the notary devices 140 may provide a more accurate view of the current state of each notary device 140 for all notary sessions assigned to that device 140.

In any event, once a notary device 140 progresses through its queue to a given notary session, the notary device 140 may use information from the notary session join request received for such session in order to initiate communication with the associated user device 102. Such notary session may be hosted by the web server 110. For example, the data communicated between the notary device 140 and the user device 102 of the notary session may flow through the web server 110, which as described above is connected to the notary matching controller 220. Thus, the notary matching controller 220 is able to monitor the notary session via the web server 110 to determine various information about the notary session, which may then be used to determine information for the metrics 118 and ratings 119.

As an example, by monitoring the notary session, the notary matching controller 220 can determine when the notary session begins and ends so that session time can be determined. In addition, the documents or other information passing through the web server 110 between the notary device 140 and the user device 102 may be analyzed by the notary matching controller 220 to determine if a successful notarization has occurred, and such information may be used to determine notary success rate. By monitoring the session, the controller 220 can determine when the notary session has ended and, in response, initiate contact with the user device 102 to solicit user feedback about the notary's performance and then adjust the ratings 119 of the session's notary based on such feedback. Various other actions for managing notary sessions and the information used by the system 108 are possible based on the monitoring of the notary sessions by the controller 220.

Exemplary uses and operations of the notary session system 108 will be described in more detail below with particular reference to the flowcharts of FIGS. 3-6.

FIG. 3 is a flow diagram illustrating an exemplary method 300 for dynamically providing notary sessions, in accordance with certain embodiments of the disclosed technology. The steps of method 300 may be performed by one or more components of the system 100 (e.g., notary matching controller 220 or web server 110 of notary session system 108, user device 102, notary device 140), as described in more detail with respect to FIGS. 1 and 2.

In block 302, the notary matching controller 220 may receive a first document from a user device 102 (e.g., first user device 102A). The first document can include one or more data entries that notary matching controller 220 can be configured to extract. In some examples, the user device 102 may be required to transmit one or more additional documents verifying the identity of the user to notary session system 108. For example, a valid driver's license, a passport, a birth certificate, and/or other types of official identification may be uploaded to notary session system 108 as part of block 302. First user device 102A can also provide one or more user-level notary requirements. The one or more user-level notary requirements can be user or entity specified requirements for the notary associated with notary device 140 that are not specifically associated with the first document. A user-level notary requirement can include a maximum wait time threshold or pre-existing notary session queue threshold specified by the user. For example, the user may indicate that he or she is not willing to wait longer than three minutes to be connected to a notary device 140 for a notary session, or the user may indicate that he or she wants to filter out notary devices 140 that have more than five pre-existing notary sessions in their queues for similar reasons. In some examples, the user-level notary requirements can include a minimum notary rating threshold. Each notary can have a rating determined by the notary matching controller 220 which can be based on a variety of factors, including average session time, success rate, number of certifications, successful completion of certain notary training courses, etc. In some examples, the notary rating can be updated based on subsequent feedback received by notary session system 108 indicating that a number of completed notary sessions associated with a respective notary device 140 were subsequently determined to be unsuccessful for one or more reasons (e.g., fraud, missing signatures, mistaken identification of one or more of the signees, etc.) The notary rating associated with each notary can be stored by notary session system 108 and dynamically updated after each completed notary session. Another user-level notary requirement can include the requirement that the notary selected should be approved by the user. In another example, the user-level notary requirement can be that a selected notary should have completed one or more notary training courses indicated by the user. In some examples, the notary training courses can be uploaded to notary matching controller 220 and notary device(s) 140 can access the training course via notary matching controller 220. Once a respective notary device 140 has completed the notary training course, an identification of the respective notary device 140 (e.g., first notary device 140A) and an indication of the completed notary training course can be stored on notary session system 108 (e.g. on database 116 and/or database 216 of notary matching controller 220). In some examples, the first user associated with first user device 102A may indicate one or more additional user devices that are to be part of a requested notary session. The indication may include an identifier such as a phone number, email address, etc. that indicates the identity of one or more additional user devices (e.g. user device 102B and user device 102C).

In block 304, the notary matching controller 220 may extract one or more data entries from the first document. In some examples, notary matching controller 220 can utilize data extraction techniques such as optical character recognition in order to identify the one or more extractable data entries from the first document. Notary matching controller 220 can then extract the data entries after they have been identified using optical character recognition.

In block 306, the notary matching controller 220 may with a first template of a plurality of templates stored on the notary session system 108 (e.g., stored on database 116 and/or database 216 of notary matching controller 220). The notary matching controller 220 may be configured to determine the applicable template based on the one or more extracted data entries from block 304. In some examples, the notary matching controller 220 can utilize a document classification algorithm, for example, a trained machine learning algorithm configured to classify a received document and associate with one of the plurality of template that may be stored on the notary session system 108. In some examples, the plurality of templates can be user-specified. For example, prior to beginning method 300, a user (e.g., via user device 102) can upload one or more templates associate with a specific document type. For example, a user can upload a template associated with a state government form that has specific notary requirements (e.g., requiring a notary that is licensed by a specific state government). As described in more detail with respect to FIG. 5, the document classification algorithm can be configured to calculate a similarity score between the uploaded document and the one or more templates uploaded to the notary session system 108. In some examples, the one or more templates can be specific to a user (e.g., a template uploaded by user device 102A can be used by user device 102A but not user device 102B, 102C, etc.) In some examples, the one or more templates can be can be used by multiple unaffiliated users (e.g., a template uploaded by user device 102A can be used by user device 102A, 102B, 102C, etc.). For example, notary matching controller 220 can compare a document uploaded by a first user devices 102A to all the templates uploaded to the system (e.g., uploaded by user device 102A, 102B, 102C, etc.). In some examples, the templates can be externally sourced and stored on notary session system 108 (e.g., on database 116 and/or database 216 of notary matching controller 220).

In block 308, the notary matching controller 220 may determine one or more document-level notary requirements. The one or more document-level notary requirements can indicate that the notary needs to be licensed by a particular state government, federal government, state agency, and/or federal agency. In some examples, the one or more document-level notary requirements can indicate that the notary should have a minimum number of transactions to be qualified. In some examples, the one or more document-level notary requirements can specify a particular type of notary service associated with the document. For example, certain documents may require a notary acknowledgement. Other documents may require jurats, and yet other documents may require an oath or affirmation. In some examples, the one or more document-level notary requirements can include a requirement for the user associated with user device 102 to provide a particular form of identification. For example, certain documents may require a notary to verify the user's identity with a passport rather than a driver's license. The one or more document-level notary requirements can be determined by the notary matching controller 220 by analyzing the one or more extracted data entries. For example, the notary matching controller 220 can extract data entries that indicate the document is a deed, mortgage, and/or a trust. Accordingly, the system can determine that a document-level notary requirement associated with the document is that the notary should provide an acknowledgement notary service. In another example, the notary matching controller 220 can determine that the document is an affidavit or deposition and accordingly determine that a document-level notary requirement associated with the document is that the notary should provide a jurat notary service. In some examples, some or all of the document-level notary requirements can be attributes associated with a template of the one or more templates stored on the notary session system 108. In such examples, once the notary session system 220 associates a document with a respective template of the one or more templates, the notary matching controller 220 can determine that the document includes the document-level notary requirements associated with the respective template. In some examples, determining one or more document-level notary requirements can include extracting one or more data entries from the first document, and associating the first document with a first template of the plurality of templates stored by notary session system 108. The association may be determined based on the one or more extracted data entries by using a document classification machine learning algorithm, as further explained with respect to FIG. 5. The method can include determining the one or more document-level notary requirements based on the first template and the one or more extracted data entries.

In block 310, the notary matching controller 220 may identify a first subset of active notary devices 140. The first subset of active notary devices 140 can be selected from all the active notary devices 140 present within the system. The first subset of active notary devices 140 can be determined based on the one or more document-level notary requirements and the one or more user-level notary requirements that were determined in step 308 and step 302, respectively. For example, a user-level notary requirement may require that a notary be accredited in a specific state, such as Virginia. Accordingly, the first subset of active notary devices 140 may be limited to notaries that are registered in the state of Virginia. In another example, a document-level notary requirement may require that a notary be capable of executing a jurat notary service. Accordingly, notary matching controller 220 may select notary devices 140 to be in the first subset of active notaries that are associated with notaries that are qualified to perform a jurat notary service. In some examples, identifying a first subset of active notary devices 140 can include communicating with each notary device 140 present within the system to determine a queue of pre-existing notary sessions associated with each notary device 140, and selecting a notary device 140 to be part of the first subset when the number of pre-existing notary sessions associated with the respective notary device 140 falls below a threshold number of sessions. Selecting the first subset of active notary devices 140 can include estimating a wait time associated with each active notary device 140 and selecting a notary device 140 to be part of the first subset when the estimated wait time is below a threshold based on the queue of pre-existing notary sessions. For example, average session time for a respective notary device 140 can be stored by notary session system 108 (e.g., via database 116 and/or database 216) and be used by notary matching controller 220 to determine a wait time based on the pre-existing notary sessions associated with the respective notary device 140. In some examples, the threshold can be user-specified (e.g., can be a user-level notary requirement received in block 302). In other examples, the notary session system 108 can dynamically select a threshold based on notary device 140 availability and their respective queues of pre-existing notary sessions. In some examples, selecting the first subset of active notary devices 140 can include selecting notaries that have a notary rating above a predetermined threshold. In some examples, the notary rating threshold can be user-specified (e.g., can be a user-level notary requirement received in block 302).

In block 312, the notary matching controller 220 may transmit a first notary session join request to the first subset of active notary devices. The first notary session join request can be transmitted using any known electronic communication method. In some examples, the first notary session join request can be sent using text message, email, and/or a push notification forwarded from notary session system 108 to each notary device 140 part of the first subset of active notary devices 140.

In decision block 314, the notary matching controller 220 may include determining whether a notary session acceptance is received within a first predetermined threshold. For example, a first notary device 140A may respond to the first notary session join request sent to the first subset of notary devices in block 312. If the notary matching controller 220 receives a notary session acceptance within the first predetermined threshold, method 300 may move to block 316. If the notary matching controller does not receive a notary session acceptance within the first predetermined threshold, method 300 may move to block 318.

In block 316, the notary matching controller 220 may initiate a first notary session between the first notary device 140A and the first user device 102A. Initiating a first notary session can include causing first notary device 140A and first user device 102A to be connected to web server 110. Web server 110 can be configured to present to both first user device 102A and first notary device 140A a video feed so that the first user is able to view the first notary on a screen of first user device 102A and the notary is able to view the first user on a screen of notary device 140A. Simultaneously, web server 110 can be configured to provide a visual indication of the first document to first user device 102A and first notary device 140A to allow a first user to e-sign the document and for the first notary to provide notary services for the first user. In some examples, when the first user device 102A indicates that one or more additional user devices 102 should be part of the notary session, the notary matching controller 220 may connect the one or more additional user devices (e.g., user device 102B and 102C) to the notary session.

In block 318, the notary matching controller 220 may, in response to a notary session join request not being accepted within the first threshold, identify a second subset of active notary devices 140. The second subset of active notary devices 140 can be selected based on the one or more document-level notary requirements and the one or more user-level notary requirements. In some examples, the second subset of active notary devices 140 can be inclusive of the first subset of active notary devices 140. In some examples, identifying the second subset of active notary devices can include relaxing the estimated wait time, number of pre-existing notary sessions, and/or the notary rating requirements indicated by the first user 102A during step 302.

In block 320, the notary matching controller 220 may transmit a second notary session join request to the second subset of active notary devices. The second notary session join request may include a second predetermined threshold during which the notary matching controller 220 is waiting for a notary session acceptance within the second predetermined threshold. For example, a second notary device 140B may respond to the second notary session join request sent to the second subset of notary devices 140. Block 320 is substantially similar to block 312 and a full description is omitted here for brevity.

In block 322, in response to receiving a notary session acceptance within the second predetermined threshold, the notary matching controller 220 may initiate a second notary session between a second notary device 140B and the first user device 102A. Block 322 is substantially similar to block 316 and a full description is omitted here for brevity.

Figure 4:
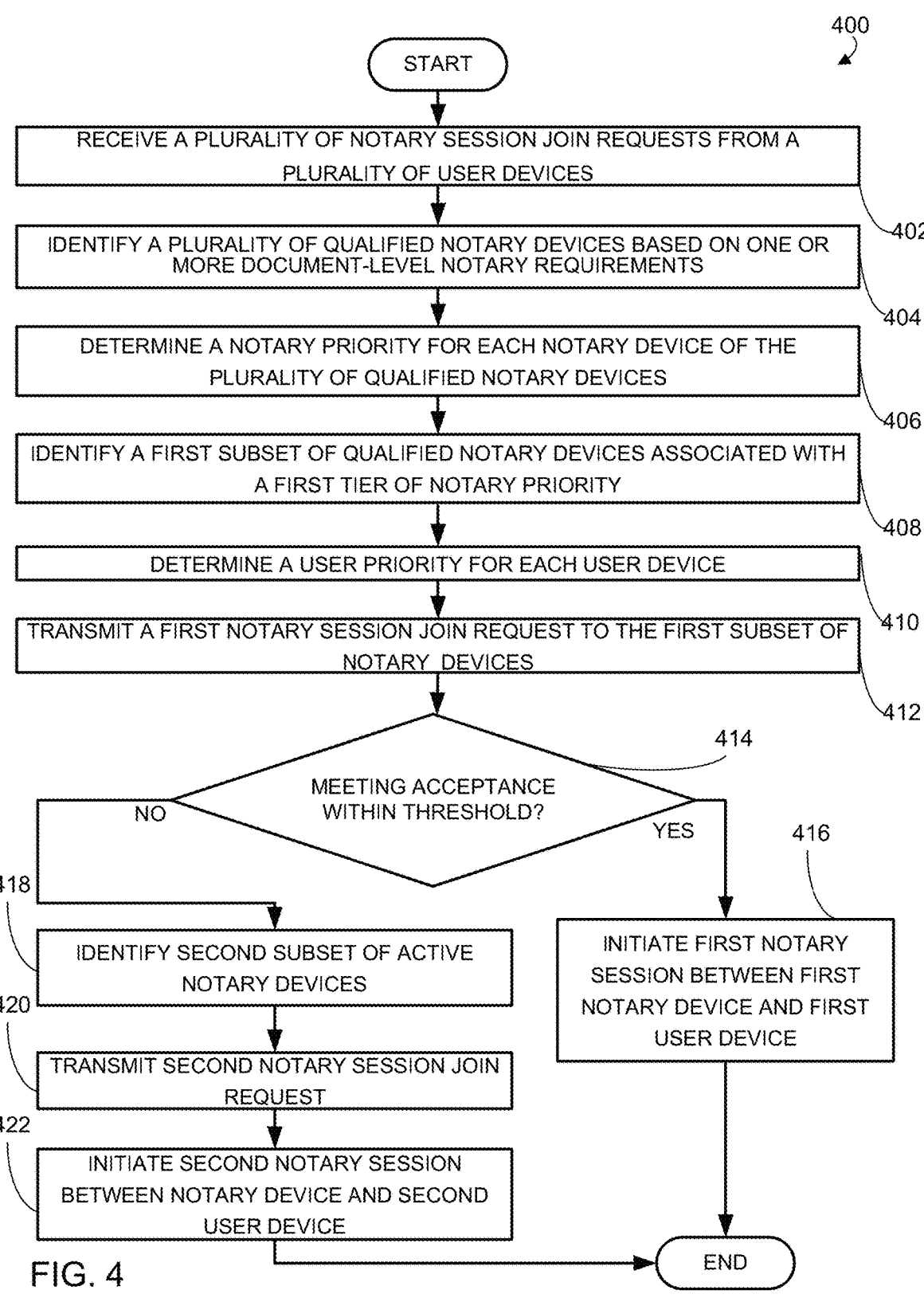
FIG. 4 is a flow diagram illustrating an exemplary method for dynamically providing notary sessions in accordance with certain embodiments of the disclosed technology.

FIG. 4 is a flow diagram illustrating an exemplary method 400 for dynamically providing notary sessions, in accordance with certain embodiments of the disclosed technology. The steps of method 400 may be performed by one or more components of the system 100 (e.g., notary matching controller 220 or web server 110 of notary session system 108, user device 102, or notary device 140), as described in more detail with respect to FIGS. 1 and 2.

Method 400 of FIG. 4 is similar to method 300 of FIG. 3, except that method 400 may not include blocks 108 or 114 of method 100. The descriptions of blocks 412, 414, 416, 418, 420, and 422 in method 400 are similar to the respective descriptions of blocks 312, 314, 316, 318, 320, and 322 of method 300 and are not repeated herein for brevity.

In block 402, the notary matching controller 220 may receive a plurality of notary session requests from a plurality of user devices 102. Each user device 102 may be simultaneously seeking a notary service. As part of the notary session request, each user device 102 can upload one or more documents to be notarized to the notary session system 108 and the notary matching controller 220 can determine one or more document-level notary requirements associated with each of the documents provided by the plurality of user devices 102.

In block 404, the notary matching controller 220 may identify a plurality of qualified notary devices based on one or more document-level notary requirements. Block 404 is similar to block 310 and a full description is omitted here for brevity.

In block 406, the notary matching controller 220 may determine a notary priority for each notary device of the plurality of qualified notary devices 140. As previously described with respect to block 302 of method 300, each notary can have a rating determined by the notary matching controller 220 which can be based on a variety of factors, including average session time, success rate, number of certifications, successful completion of certain notary training courses, etc. In some examples, the notary rating can be updated based on subsequent feedback received by notary session system 108 indicating that a number of completed notary sessions associated with a respective notary device 140 were subsequently determined to be unsuccessful for one or more reasons (e.g., fraud, missing signatures, mistaken identification of one or more of the signees, etc.) The notary rating associated with each notary can be stored by notary session system 108 and dynamically updated after each completed notary session. In some examples, the notary rating can be used by notary matching controller 220 to determine the notary priority among the plurality of notary devices 140, as described above.

In block 408, the method can include identifying a first subset of qualified notary devices 140 associated with a first tier of notary priority. For example, the first tier of notary priority can be associated with notaries that have a notary rating higher than a predetermined threshold. In some examples, notaries can be selected for the first tier based on the factors discussed with respect to block 406.

In block 410, the notary matching controller 220 may determine a user priority for each user device 102. For example, each user can be assigned a priority based on a dynamic bidding process, in which users with a higher price bid for the notary service is offered a higher priority among the plurality of users. In some examples, user priority can be based on other factors, such as a number of transactions previously conducted using notary session systems 108, with priority being given to repeat users. A first user (e.g., user device 102A) with a highest user priority may be selected by notary matching controller 220, and a first notary session join request associated with the user device 102A can be transmitted to the first subset of notary devices in block 412.

Figure 5:
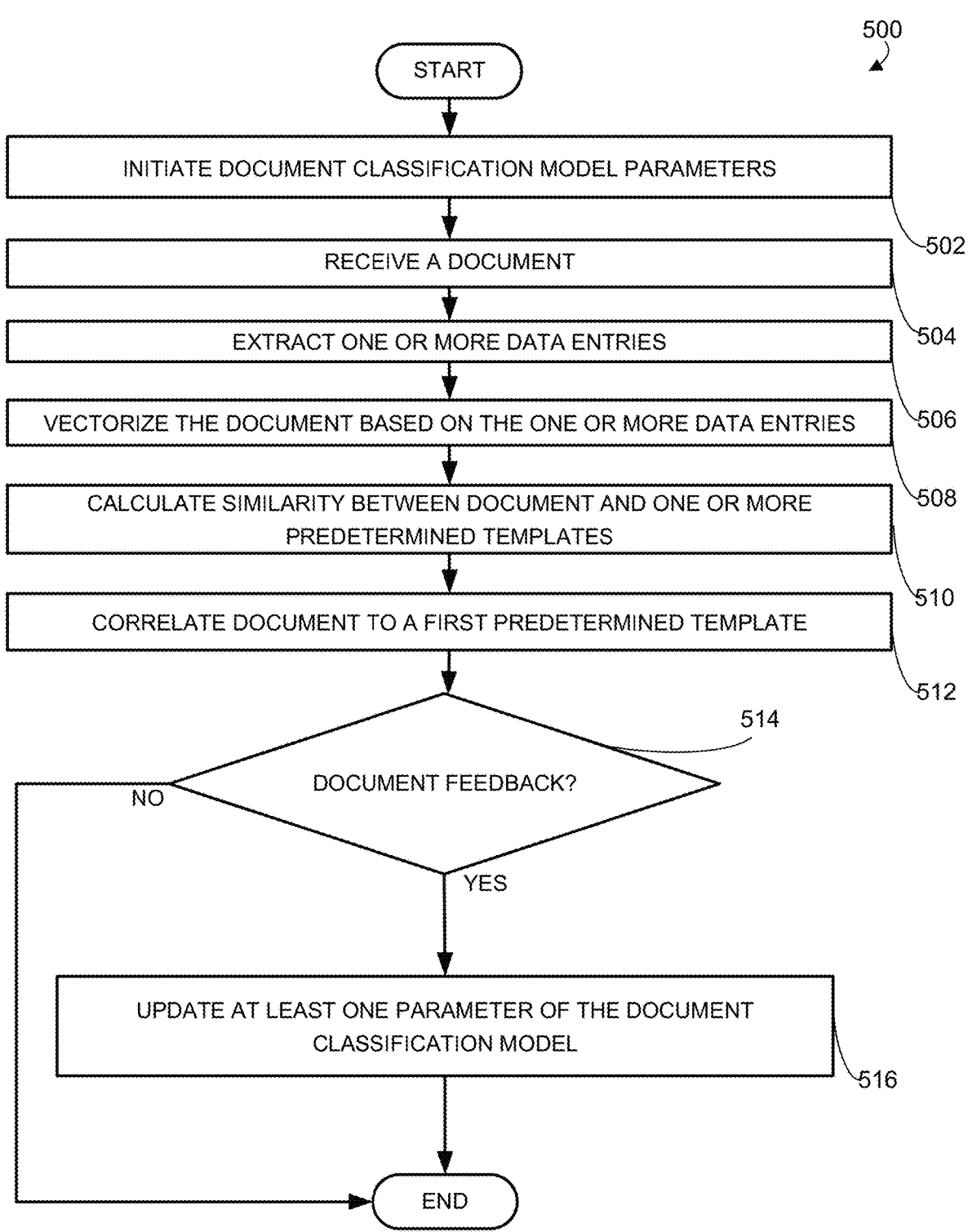
FIG. 5 is a flow diagram illustrating an exemplary method for updating a document classification machine learning algorithm in accordance with certain embodiments of the disclosed technology.

FIG. 5 is a flow diagram illustrating an exemplary method for updating a document classification machine learning algorithm. The steps of method 500 may be performed by one or more components of the system 100 (e.g., notary matching controller 220 or web server 110 of notary session system 108, user device 102, or notary device 140), as described in more detail with respect to FIGS. 1 and 2.

In block 502, notary matching controller 220 may initialize document classification model parameters. For example, the document classification model can be a trained neural network such as bidirectional encoder representations from transformers (BERT), although this disclosure is not limited to the use of BERT.

In block 504, notary matching controller 220 may receive a document (e.g., a first document from a first user device 102A). In block 506, notary matching controller 220 may extract one or more data entries in a similar manner as described with respect to FIG. 3. In block 508, notary matching controller 220 may vectorize the document based on the one or more data entries. In some examples, the trained machine learning model (e.g., BERT) may identify the one or more data entries (e.g., words in a text) extracted from the document and build a vector that represents the meaning and context of the document. In another example, in block 508, notary matching controller 220 may determine a hash value based on the one or more data entries. For example, notary matching controller 220 may be configured to calculate a hash value based on the one or more data entries using a locality sensitive hashing technique in which small variations in an input to the hashing function generate a proportionally small change in an output hash value.

In block 510, notary matching controller 220 may calculate the similarity between the document and each template of one or more predetermined templates that are stored on notary session system 108. In some examples, the trained machine learning algorithm can vectorize the data entries associated with each predetermined template in a similar manner as described in block 504. In other examples, notary matching controller 220 may determine a hash value using a locality sensitive hashing technique based on the data entries of each predetermined template in a similar manner as described in block 508. In any case, the similarity can be calculated by any known method. In some examples, the similarity between the document and each predetermined template can be determined based on using Euclidean distance, cosine distance, dot product, or other measure of statistical similarity between the vectors generated in block 508 and block 510 or alternatively, between the hash functions generated in block 508 and block 510.

In block 512, notary matching controller 220 can correlate the document to a first predetermined template. The notary matching controller 220 can choose the first predetermined template based on it having the highest similarity to the document, as described above.

In decision block 514, the notary matching controller 220 can determine whether document training feedback has been received. When no document training feedback has been received, method 500 may end. When document training feedback is received, method 500 may proceed to block 516. Document training feedback can be provided by users (e.g., via user device(s) 102) and can provide an indication as to how closely the uploaded document matches the template that the machine learning model identifies as having the closest similarity. Subsequently, in block 516, notary matching controller 220 can update at least one parameter of the document classification model based on the feedback received in block 514.

Figure 6:
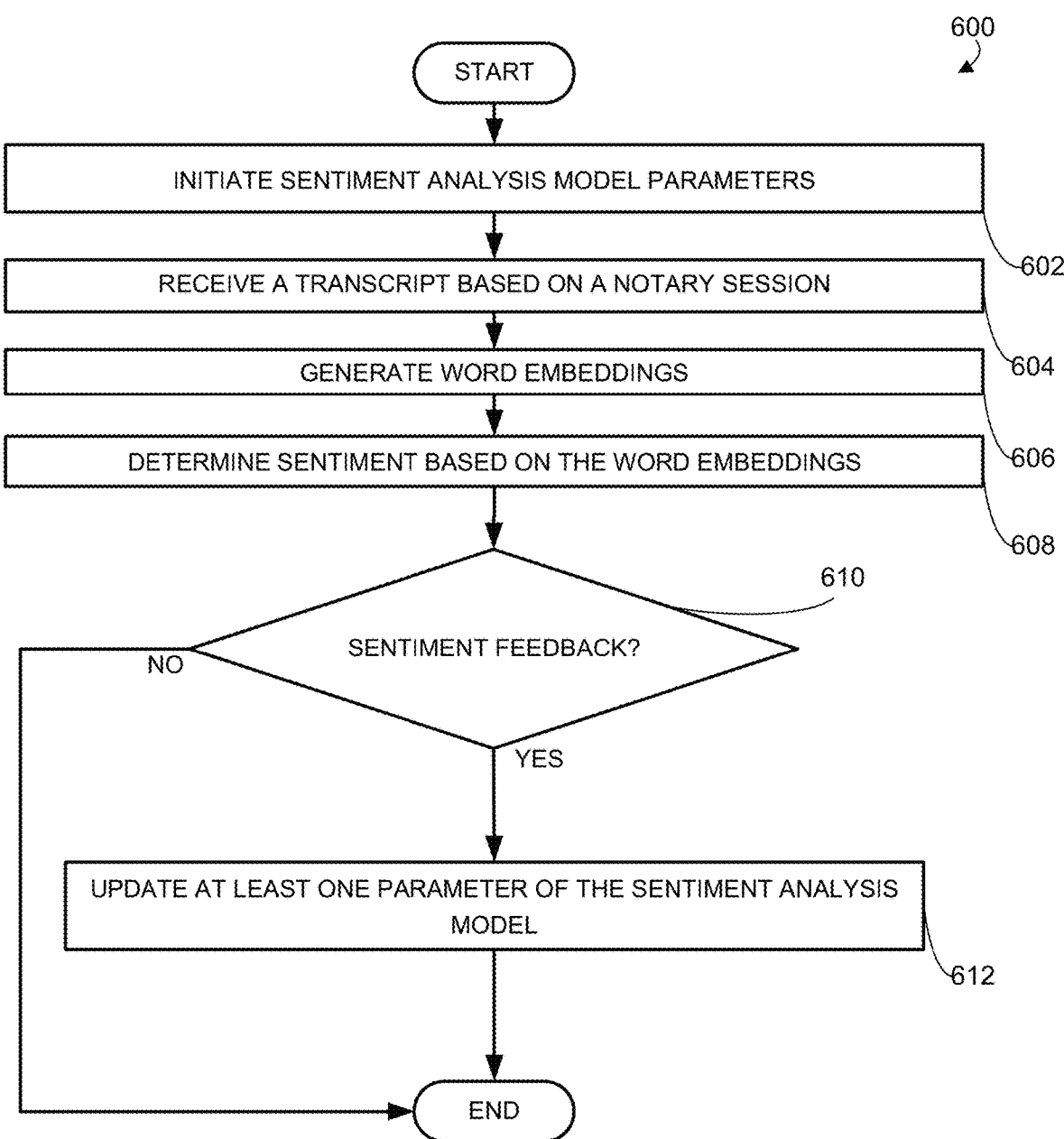
FIG. 6 is a flow diagram illustrating an exemplary method for updating a sentiment analysis machine learning algorithm in accordance with certain embodiments of the disclosed technology.

FIG. 6 is a flow diagram illustrating an exemplary method for updating a sentiment analysis machine learning algorithm. The steps of method 600 may be performed by one or more components of the system 100 (e.g., notary matching controller 220 or web server 110 of notary session system 108, user device 102, or notary device 140), as described in more detail with respect to FIGS. 1 and 2.

In block 602, notary matching controller 220 may initialize sentiment analysis model parameters. For example, the sentiment analysis model can be a trained neural network such as BERT or a convolutional neural network (CNN), although this disclosure is not limited to the use of BERT or a CNN.

In block 604, notary matching controller 220 may receive an audio transcript of a notary session. In some examples, the web server 110 can be configured to transcribe the notary session into a text transcript that can be sent to the notary matching controller via local network 106. For example, web server 110 can utilize known speech to text algorithms to generate a transcript based on an audio recording of the notary session. In other embodiments, the notary matching controller 220 can be configured to transcribe the notary session utilizing known speech to text algorithms. The text transcript generated in block 604 can include one or more strings of words representing the interaction between a notary and a user during the notary session.

In block 606, notary matching controller 220 may generate word embeddings based on the transcript received in block 604. Word embeddings can be understood as a computer-implemented method to generate a vector associated with a series of words that represents the meaning of the series of words in numerical form. Specifically, word embeddings can be understood as vector representations of an input string of words in which the semantic relationship between words are reflected in the distance and direction of the vectors. Each word is positioned into a multi-dimensional vector space, and the vector values for a word represent its position in the vector space. Synonyms are found close to each other while words with opposite meanings may have a large distance between them. For example, the word embedding for the word "queen" may have a high similarity (and proportionally low distance) to the word embedding for the word "king." In some cases, a series of mathematical functions can be performed on word embeddings. For example, a word embedding for "king" may be added to a word embedding for "female" which may generate a word embedding for "queen" according to some embodiments. Accordingly, notary matching controller 220 may be configured to utilize machine learning algorithms to perform operations on the generated word embeddings to determine the sentiment associated with a given transcript of a notary session.

In block 608, the method can include notary matching controller 220 determining sentiment based on the word embeddings generated in block 606. For example, notary matching controller 220 can utilize a classifier model, such as a neural network, in order to analyze the word embeddings and determine a sentiment score associated with the transcript.

In decision block 610, notary matching controller 220 can include determining whether the notary matching controller 220 has received sentiment feedback. In response to not receiving sentiment feedback, method 600 can end. In response to receiving sentiment feedback, method 600 can move to block 612. In some examples, sentiment feedback can be provided by users (e.g., via user device(s) 102) that provide an indication of how positively or negatively he or she evaluates the notary session completed via notary session system 108. For example, users may respond with a sentiment score on a 1-10 scale, with a score of 10 being equivalent to being most satisfied with the notary session and a score of 1 being equivalent to being most dissatisfied with the notary session.

Subsequently, in block 612, notary matching controller 220 can update at least one parameter of the document classification model based on the feedback received in block 610.

Figure 7A:
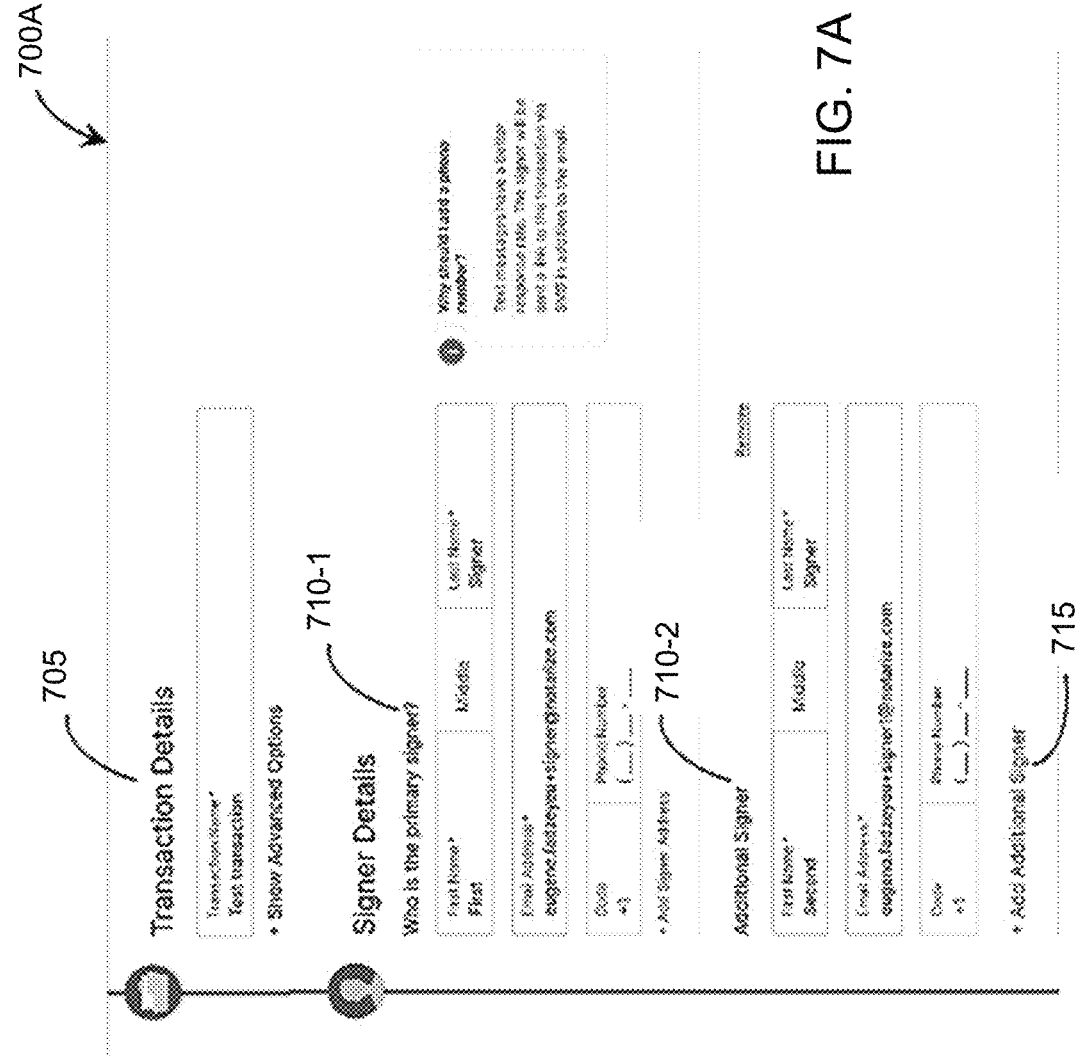
FIG. 7A shows an illustrative screen 700A for providing user information in accordance with certain embodiments of the disclosed technology.

FIG. 7A shows an illustrative screen 700A for providing user information associated with a requested notary session, in accordance with some embodiments. For instance, the screen 700A may be presented to a user device 102 by the notary session system 108 to prompt a user to provide user information associated with a notary session.

In some embodiments, the screen 700A may include a section 705, where a user may be prompted to create a transaction name for the requested notary session. In some embodiments, when one or more second users wish to join a notary session, the one or more second users may be prompted to enter a transaction name from section 705 created by a first user in order to be connected to the notary session requested by the first user.

In some embodiments, a user may be requested to enter identifying information in section 710-1. Examples of identifying information include, but are not limited to, name, email address, physical address, phone number, etc.

Additionally, or alternatively, the screen 700A may include a section 710-2, where the user may be prompted to provide identifying information for a second user associated with the requested notary session. However, it should be appreciated that aspects of the present disclosure are not limited to having any particular number of user(s). In some instances, the user may leave the section 710-2 blank. In some other instances, the user may fill in the section 710-2, and may click on a button 715 to add a third user.

Figure 7B:
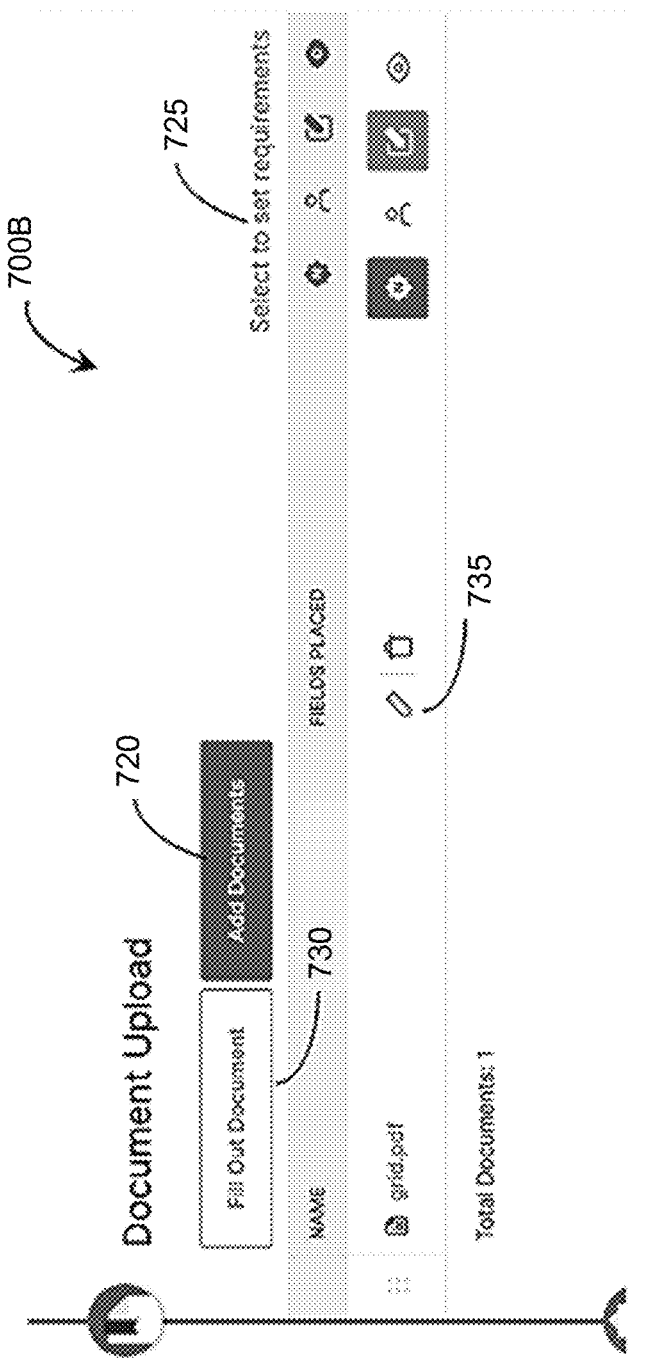
FIG. 7B shows an illustrative screen 700B for uploading a document in accordance with certain embodiments of the disclosed technology.

FIG. 7B shows an illustrative screen 700B for uploading a document associated with a notary session, in accordance with some embodiments. For instance, the illustrative screen 700A in the example of FIG. 7A and the screen 700B may belong to the same notary session request screen. The user (e.g., via user device 102) may scroll down from the screen 700A to reach the screen 700B.

In some embodiments, the screen 700B may include a button 720 for obtaining a document for upload. For instance, the user may click the button 720 to activate an interface for navigating one or more storage drives to select a document. Additionally, or alternatively, the user may click the button 720 to activate an interface for acquiring a document via a scanner or a camera.

Once a document has been uploaded, the user may use a section 725 of the screen 700B to indicate one or more actions to be performed with respect to the document. For instance, the user may indicate whether the document is read-only, whether a signature is needed, whether the signature should be witnessed, whether the signature should be notarized, etc. Alternatively, in some examples, notary matching controller 220 may extract data entries from the uploaded document(s) and determine the document requirements based on the extracted data entries rather than the requirements being provided by the user.

It should be appreciated that aspects of the present disclosure are not limited to selecting or acquiring an existing document. In some embodiments, the user may create a new document by filling out a document template. For instance, the user may click a button 530 to activate an interface for selecting a desired template from a list of one or more available templates stored on notary session system 108. In some examples, a user may click on edit icon 735 to navigate to the screen shown in FIG. 7C for preparing or editing a document prior to requesting a notary session with notary session system 108.

Figure 7C:
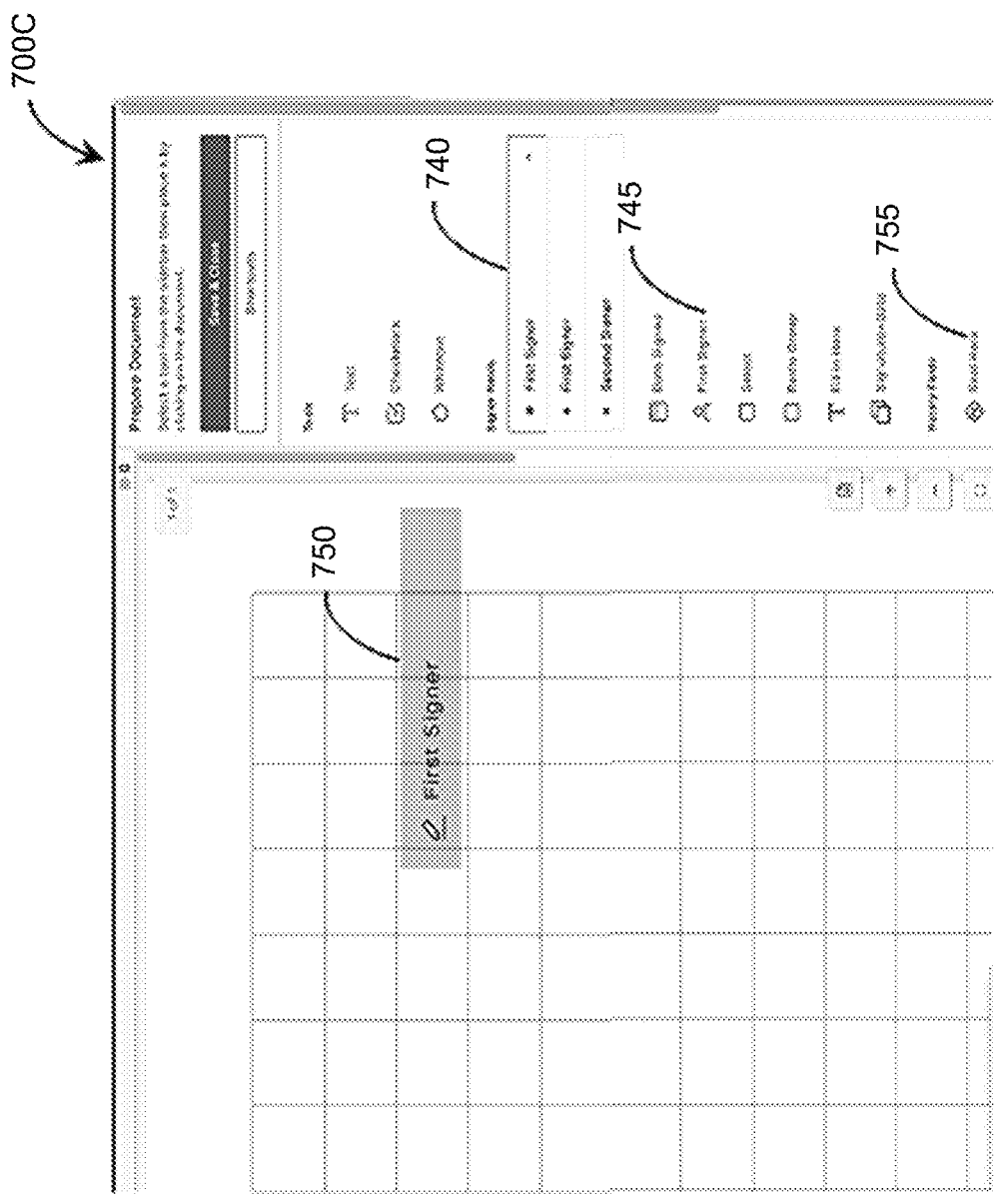
FIG. 7C shows an illustrative screen 700C for preparing a document for a notary session in accordance with certain embodiments of the disclosed technology.

FIG. 7C shows an illustrative screen 700C for preparing a document prior to requesting a notary session with notary session system 108, in accordance with some embodiments. In some embodiments, the screen 700C may display the selected document in the background, and may allow the user to make one or more changes to the document. For instance, the screen 700C may include a tool bar with one or more editing tools, such as a tool for inserting text, a tool for adding a checkmark, a tool for removing text or other marking, etc.

Additionally, or alternatively, the tool bar may include a section for adding one or more user fields. For instance, there may be a dropdown menu 740 for selecting a user from a list of one or more users. For example, users may be added based on the number of users indicated on screen 700A (e.g., via inputs 710-1, 710-2, etc.) in FIG. 7A. In some examples, the menu 740 may be dynamically populated using user names identified by the user via the illustrative screen 700A (e.g., via inputs 710-1, 710-2, etc.) in the example of FIG. 7A. Once a user has been selected from the menu 740, the administrator may click on a user field type, and then click on a location in the displayed document to place a field of the selected type at the selected location.

For instance, in response to the user selecting a user from the menu 740, a signature field button 745 may be dynamically updated to show the selected user's name (e.g., "First Signer"). The user may add a signature field 750 for the selected user by clicking the signature field button 745, and then clicking a desired location in the document. Additionally, or alternatively, in response to the user selecting a user from the menu 740, an initial field button (not shown) may be dynamically updated to show the selected user's initials (e.g., "F. S."). The user may add an initial field (not shown) for the selected user by clicking the initial field button, and then clicking a desired location in the document.

Additionally, or alternatively, the tool bar may include a section for adding one or more notary fields. For instance, the administrator may add a seal field by clicking a seal field button 755, and then clicking a desired location in the document.

It should be appreciated that aspects of the present disclosure are not limited to having a user prepare a document for signing. In some embodiments, one or more functions described above with respect to preparing the document for signing can be completed automatically by the notary session system 108 (e.g., via notary matching controller 220). For example, notary matching controller 220 may be used to insert one or more appropriate fields into a document. Illustrative techniques for document preparation are described in U.S. Provisional Application No. 63/182,429, filed on Apr. 30, 2021, entitled "DOCUMENT CLASSIFI-CATION AND MARKING FOR USER INTERAC-TIONS," which is incorporated herein by reference in its entirety.

In some embodiments, when the user finishes finalizing the document, the notary session system 108 may send a notification to each identified user (e.g., via web server 110). Such a notification may be sent in any suitable manner, for example, via an email, text message, and/or push message via an application installed on the memory of user device 102. The notification may include a link that may be used by the user to initiate the notary session.

FIG. 8A shows an illustrative screen 800A for initiating a notary session with notary session system 108, in accordance with some embodiments. For instance, the screen 800A may be shown to a user by the web server 110 in response to the user joining a notary session.

In some examples, multiple users may be present at the same physical location, and may participate in an online signing session using the same device (e.g., first and second users both using user device 102A). Accordingly, in some embodiments, the screen 800A may prompt the user to identify one or more co-located users.

In some embodiments, in response to the user initiating a notary session via the screen 600A, the notary session system 108 may prompt the user to provide identifying information, and/or may present one or more knowledge-based authentication (KBA) challenges to the user. For instance, the notary session system 108 may use identifying information provided by the user to query a KBA service. One or more challenges received from the KBA service may be forwarded to the user device 102 for presentation to the user. One or more responses provided by the user may be transmitted from the user device 102 to the notary session system 108, which may in turn forward the responses to the KBA service for evaluation.

In some embodiments, if multiple users are sharing a device, identity verification (e.g., identity capture and/or KBA) may be performed for such users sequentially. If one of the users fails to undergo identity verification success-fully, then none of the users may be allowed to proceed. A user who is able to undergo identity verification successfully may be instructed to initiate another online signing session by himself/herself.

In some examples, security may be improved by requiring all co-located users to undergo identity verification success-fully. However, in some embodiments, a user who is able to complete identify verification successfully may be allowed to proceed with a notary session, even if a co-located user is unable to do so.

Figure 8B:
FIG. 8B shows an illustrative screen 700A for a notary session in accordance with certain embodiments of the disclosed technology.

FIG. 8B shows another illustrative screen 800B, in accordance with some embodiments. For instance, the notary session system 108 may show the screen 800B to the user (e.g., via user device 102) when the user successfully undergoes identity verification. The screen 800B may include a live video feed 810 of the user, and/or a notifica-tion that audio and video of the online signing session will be recorded.

In some embodiments, in response to the user initiating the notary session, the notary session system 108 may search for an available service provider with one or more appro-priate qualifications (e.g., user-level notary requirements and/or document-level notary requirements). For instance, a document for notarization in a notary session may be subject to regulation by a certain government agency or other organization, which may require that the notary session be conducted by a notary with a commission from a selected authority. Additionally, or alternatively, the agency or other organization may require that the notary session be con-ducted by a notary with a commission from an authority with jurisdiction over the user (e.g., based on the user's residence or current physical location).

Accordingly, the notary session system 108 may identify a subset of active notary devices 140 as described in more detail with respect to FIGS. 3-4 to determine a notary who is both available and qualified. The notary session system 108 may attempt to connect a notary device 140 with one or more user device(s) 102, depending on the number of users signing a respective document in the notary session. Mean-while, the notary session system 108 (e.g., via notary matching controller 220) may provide an estimated wait time based on notary device 140 activities (e.g., average durations of online signing sessions associated with various document types, and/or elapsed times of online signing sessions that are currently taking place). This estimated wait time may be displayed to the user via the screen 800B.

As described in more detail with respect to FIGS. 3-4, the notary session system 108 may notify a subset of active notary devices 140 that a user is awaiting notary service. If the user has waited for a threshold amount of time (e.g., 5 min, 10 min, etc.) but no notary device 140 is available, the notary session system 108 may expand a second subset of active notary devices 140 to include additional notaries, so that the user may be connected with a notary device 140 sooner. As an example, notary qualifications may be relaxed so that there is greater pool of notary devices 104 that may be used for the notary session, as described above. This may be repeated one or more times, so that successively larger pools of qualified notary devices 140 may receive a notary session join request, until a notary device 140 transmits a notary session acceptance.

Figure 8C:
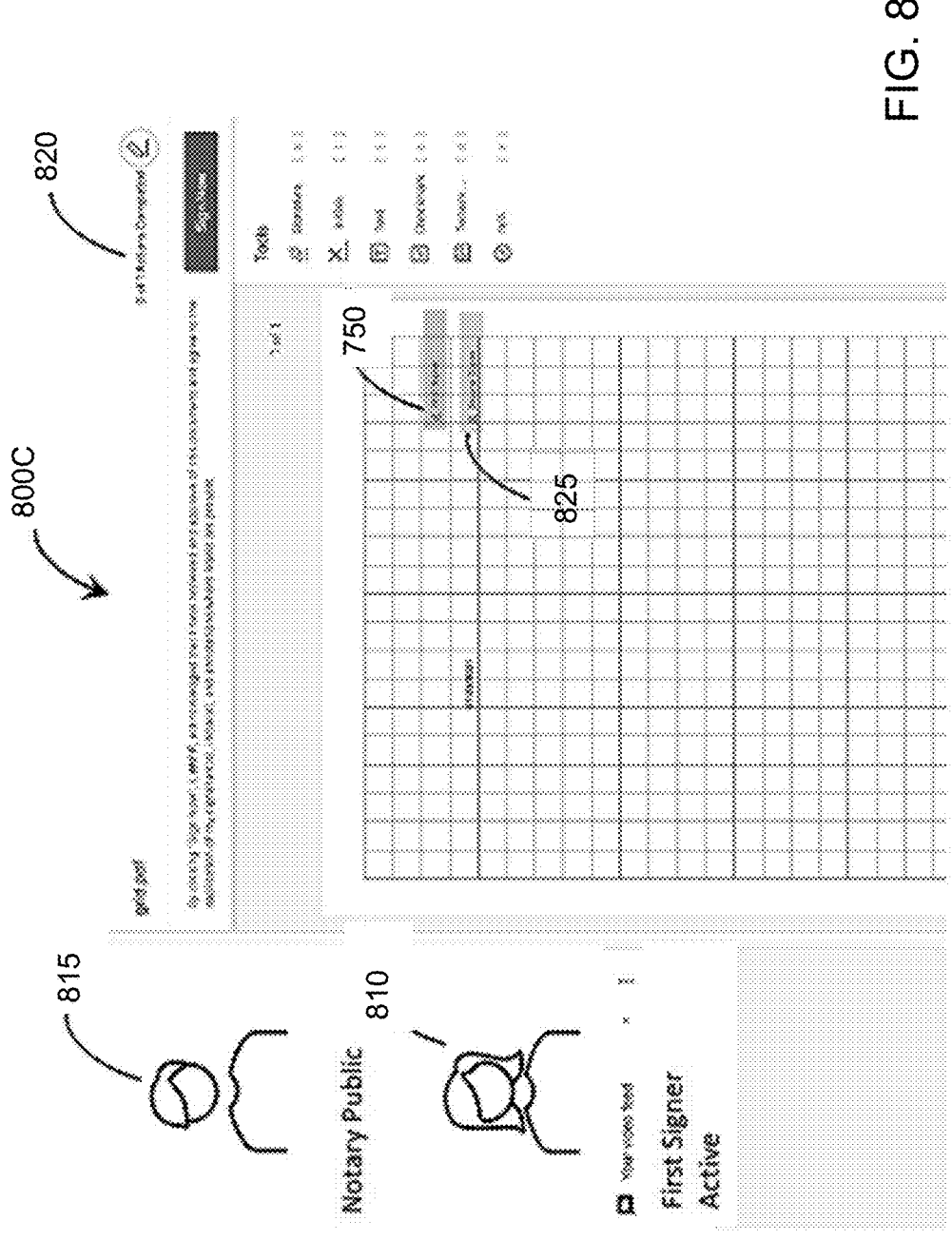
FIG. 8C shows an illustrative screen 700A for a notary session in accordance with certain embodiments of the disclosed technology.

FIG. 8C shows another illustrative screen 800C, in accor-dance with some embodiments. For instance, in response to the notary session system 108 connecting a notary device 140 to the notary session initiated by the user, the user device 102 may replace the illustrative screen 800B in the example of FIG. 8B with the screen 800C.

In some embodiments, the screen 800C may include the live video feed 810 of the user. It should be understood that live video feed 810 can include additional video feeds for each user associated with the notary session (e.g., first user, second user, third user, etc.). Additionally, or alternatively, the screen 800C may include a live video feed 815 of the notary associated with the connected notary device 140.

In some embodiments, the screen 800C may display a document to the user device 102. One or more annotations may be layered on top of the document, such as the signature field 750. Additionally, or alternatively, the screen 800C may display, at 820, a count of actions to be performed by the user (e.g., inserting an annotation such as a date, a signature, initials, text, etc.). In this example, one action may be expected of the user, such as inserting a signature at the signature field 750.

In some embodiments, the signature field 750 may be a first signature field, and the user may be a first user. The first user may have added another signature field 825 for a second user different from the first user. Accordingly, the user device 102 may display the signature field 825 to the first user in a disabled form. This may prevent the first user from accidentally inserting a signature at the signature field 825.

Figure 8D:
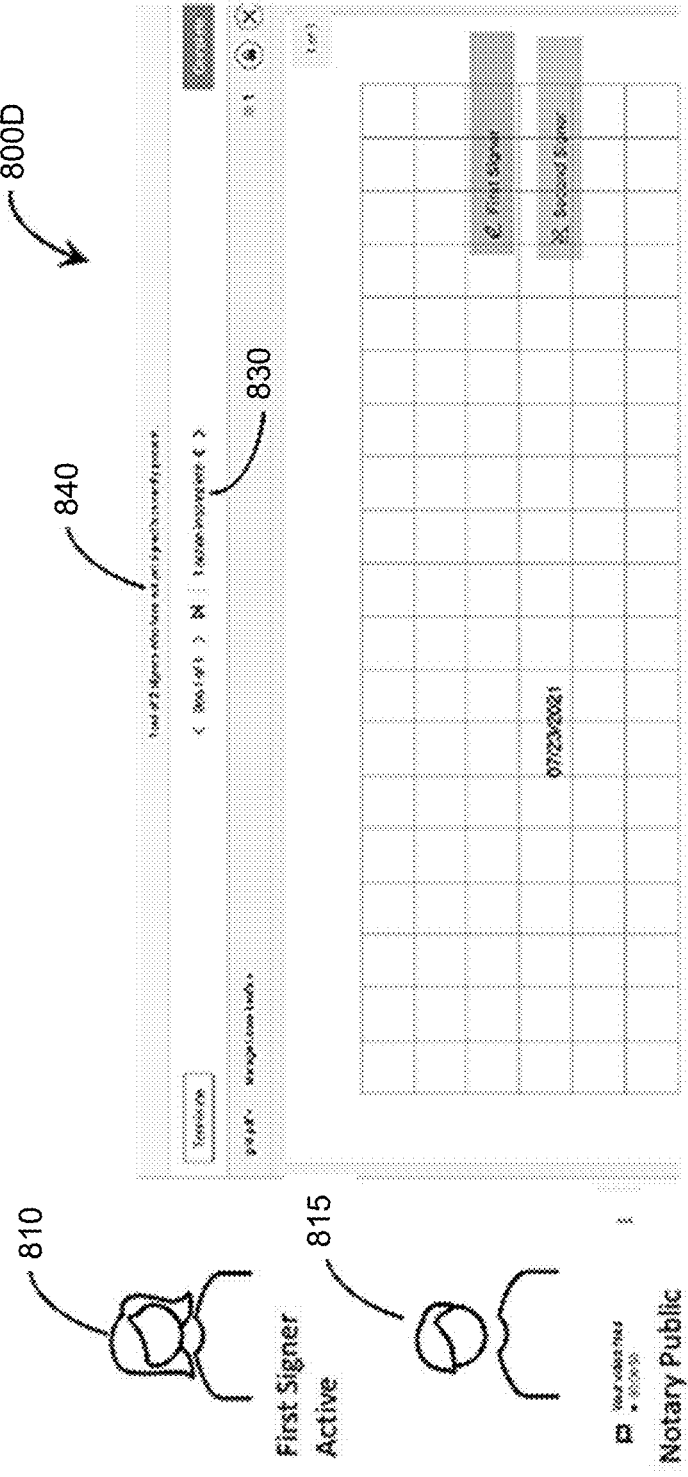
FIG. 8D shows an illustrative screen 700A for a notary session in accordance with certain embodiments of the disclosed technology.

FIG. 8D shows another illustrative screen 800D, in accordance with some embodiments. For instance, the screen 800D may be shown by the notary device 140 to the notary who has joined the notary session. The screen 800D may be similar to the illustrative screen 800C in the example of FIG. 8C. For instance, the screen 800D may display the same document displayed in the screen 800C. Additionally, or alternatively, the screen 800D may include the live video feed 810 of the first user (and one or more additional second users), and/or the live video feed 815 of the notary. Additionally, or alternatively, the screen 800D may display, at 830, the count of actions to be performed by the connected notary.

In some embodiments, the notary may review the document provided by the user device 102, and may instruct the first user to perform an action. For instance, the notary may determine what notarial act is required (e.g., an acknowledgement or a jurat), and may follow a corresponding procedure. As an example, if an acknowledgement is required, the service provider may ask the first user to present a government-issued photo ID via the live video feed 810, and may determine if the first user is the same person shown in the photo ID. If the notary is satisfied that the first user is the person expected to sign the document, the notary may ask the first user to insert a signature at the signature field 750. This process may be repeated for each user within the notary session. For example, if a second user and a third user are present, the notary may verify the identity of both the second user and the third user, and ask the second user and the third user to insert a signature.

As another example, if a jurat is required, the service provider may review the first user's ID as described above, and may administer an oath or affirmation prior to asking the first user to insert a signature at the signature field 750. This process may be repeated for each user within the notary session. For example, if a second user and a third user are present, the notary may verify the identity of both the second user and the third user, administer an oath or affirmation, and may ask the second user and the third user to insert a signature.

In some embodiments, the screen 800D may include a tool bar (not shown) similar to that in the example of FIG. 7C. The notary may, during the notary session, use the tool bar to add user and/or notary fields, and/or make one or more other changes to the document.

It should also be appreciated that aspects of the present disclosure are not limited to having the user perform every expected action while being observed by the notary. In some embodiments, a user field (e.g., text, initials, signature, date, etc.) may have associated metadata that indicates how a user should complete the user field (e.g., witness only, acknowledgement, jurat, oath or affirmation only, etc.). The notary matching controller 220 may use such metadata to identify one or more actions that the user may perform while the user is waiting for the notary session system 108 to connect the user device 102 to a notary device 140.

Additionally, or alternatively, the notary matching controller 220 may use the metadata to identify one or more actions that the user may not perform without the notary. Such an action may be disabled until the user device 102 is connected to the notary device 140.

In some embodiments, the screen 800D may, at 840, indicate to the notary device 140 of a number of user(s) currently present in the notary session. For instance, if a second user has not joined the notary session, the screen 800D may show that only one of two expected users is present.

In some examples, the first user may begin working with the notary as soon as the service notary device 140 is connected to the first user device 102A, without waiting for a second user device 102B to be connected to the notary session system 108. Indeed, in some instances, the first user may finish before the second user is connected to the notary device 140. In some embodiments, the notary session may be terminated, and a subsequent session may be separately initiated by the second user. The same notary device 140 (e.g., notary device 140A), or a different notary device 140 (e.g., notary device 140B), may join the subsequent notary session.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for providing notarization services, the system comprising:
   one or more computer hardware processors;
   a non-transitory memory in communication with the one or more computer hardware processors and storing instructions that, when executed by the one or more computer hardware processors, are configured to cause the one or more computer hardware processors to at least:
   receive, over at least one computer-implemented network, a first document and one or more user-level notary requirements from a first user device associated with a first user;
   extract one or more data entries from the first document;
   associate the first document with a first template of a plurality of templates based on the one or more extracted data entries;
   determine one or more first document-level notary requirements based on the first template and the one or more extracted data entries, the one or more first document-level notary requirements indicating one or more first qualifications for a notary to possess to conduct a notary session associated with the first document;
   detect a plurality of active notary devices connected to the at least one computer-implemented network;
   identify a first subset of active notary devices of the plurality of active notary devices based on the one or more first document-level notary requirements and the one or more user-level notary requirements, the identifying of the first subset of active notary devices comprises:
   accessing, over the at least one computer-implemented network, one or more second document-level notary requirements stored in the plurality of active notary devices, the one or more second document-level requirements indicating one or more second qualifications of notaries associated with the plurality of active notary devices; and
   identifying, by comparing the one or more first document-level notary requirements to the one or more second document-level notary requirements using the one or more computer hardware processors, one or more of the plurality of active notary devices as associated with a notary meeting the one or more first qualifications, the first subset of active notary devices comprising the one or more of the plurality of active notary devices;
   transmit, over the at least one computer-implemented network, a first notary session join request to the first subset of active notary devices; and
   responsive to receiving a first notary session acceptance over the at least one computer-implemented network from a first notary associated with a first notary device of the first subset of active notary devices within a first predetermined time threshold, initiate a first notary session between the first notary device and the first user device, the initiating comprising establishing electronic communication between the first notary device and the first user device over the at least one computer-implemented network.

2. The system of claim 1, wherein the instructions cause the one or more computer hardware processors to determine a notary priority for each notary device of the plurality of active notary devices.

3. The system of claim 1, wherein the instructions cause the one or more computer hardware processors to:
   estimate a wait-time associated with each notary device of the plurality of active notary devices, each wait-time based on a number of pre-existing notary session join requests within a queue associated with a respective notary device of the plurality of active notary devices;
   compare the estimated wait-time associated with each notary device to a predetermined wait threshold; and
   include the respective notary device in the first subset of active notary devices when the estimated wait-time associated with the respective notary device does not exceed the predetermined wait threshold.

4. The system of claim 3, wherein the instructions cause the one or more computer hardware processors to:
   compare, using the one or more processors, the estimated wait-time associated with each notary device of the first subset of active notary devices to the first predetermined time threshold; and
   transmit a second notary session join request to a second subset of the notary devices responsive to each estimated wait-time exceeding the first predetermined time threshold.

5. The system of claim 1, wherein extracting one or more data entries from the first document comprises utilizing optical character recognition to identify one or more data entries within the first document.

6. The system of claim 1, wherein a notary session join request is selected from a push notification, a text message, an email, and combinations thereof.

7. The system of claim 1, wherein the instructions cause the one or more computer hardware processors to:

update a notary rating associated with the first notary based on the first notary session, wherein the notary rating is based at least in part on a notary session success rate associated with the first notary, average session time associated with the first notary, and a number of completed notarizations subsequently identified as fraudulent associated with the first notary.

8. The system of claim 1, wherein the instructions cause the one or more computer hardware processors to:

determine a notary rating associated with the first notary session by:

creating a transcript based on the first notary session; and utilizing a sentiment analysis algorithm to analyze the transcript.

9. The system of claim 8, wherein the instructions cause the one or more computer hardware processors to:

receive sentiment feedback from the first user device associated with the first notary session; and update the sentiment analysis algorithm based on the sentiment feedback.

10. The system of claim 1, wherein the instructions cause the one or more computer hardware processors to:

receive a secondary user identifier from the first user device;

associate a second user device with the first notary session join request based on the secondary user identifier; and join the second user device to the first notary session.

11. A system for providing notarization services, the system comprising:

one or more computer hardware processors;

a non-transitory memory in communication with the one or more computer hardware processors and storing instructions that, when executed by the one or more computer hardware processors, are configured to cause the system to at least:

receive, over at least one computer-implemented network, a first document and one or more user-level notary requirements from a first user device associated with a first user;

extract one or more data entries from the first document;

associate the first document with a first template of a plurality of templates based on the one or more extracted data entries using a document classification machine learning algorithm;

determine one or more first document-level notary requirements based on the first template and the one or more extracted data entries, the one or more first document-level notary requirements indicating one or more first qualifications for a notary to possess to conduct a notary session associated with the first document;

detect a plurality of active notary devices connected to the at least one computer-implemented network;

identify a first subset of active notary devices of the plurality of active notary devices based on the one or more first document-level notary requirements and the one or more user-level notary requirements, the identifying of the first subset of active notary devices comprises:

accessing, over the at least one computer-implemented network, one or more second document-level notary requirements stored in the plurality of active notary devices, the one or more second document-level requirements indicating one or more second qualifications of notaries associated with the plurality of active notary devices; and identifying, by comparing the one or more first document-level notary requirements to the one or more second document-level notary requirements using the one or more computer hardware processors, one or more of the plurality of active notary devices as associated with a notary meeting the one or more first qualifications, the first subset of active notary devices comprising the one or more of the plurality of active notary devices;

transmit, over the at least one computer-implemented network, a first notary session join request to a first subset of active notary devices;

responsive to receiving a first notary session acceptance over the at least one computer-implemented network from a first notary associated with a first notary device of the first subset of active notary devices within a first predetermined time threshold, initiate a first notary session between the first notary device and the first user device, the initiating comprising establishing electronic communication between the first notary device and the first user device over the at least one computer-implemented network; and responsive to not receiving the first notary session acceptance within the first predetermined time threshold:

identify a second subset of active notary devices based on the one or more first document-level notary requirements and the one or more user-level notary requirements;

transmit a second notary session join request to the second subset of active notary devices; and responsive to receiving a second notary session acceptance from a second notary associated with a second notary device of the second subset of active notary devices within a second predetermined time threshold, initiate a second notary session between the second notary device and the first user device.

12. The system of claim 11, wherein associating the first document with the first template of a further comprises:

receiving the first document in a non-standardized format;

determining that the one or more extracted data entries match the first template beyond a predetermined threshold with the document classification machine learning algorithm; and standardizing the received first document based on the first template.

13. The system of claim 11, wherein the instructions cause the one or more computer hardware processors to:

update a notary rating associated with the first notary based on the first notary session, wherein the notary rating is based at least in part on a notary session success rate associated with the first notary, average session time associated with the first notary, and a number of completed notarizations subsequently identified as fraudulent associated with the first notary.

14. The system of claim 11, wherein the instructions cause the one or more computer hardware processors to:

determine a notary rating associated with the first notary session by:

creating a transcript based on the first notary session; and utilizing a sentiment analysis algorithm to analyze the transcript;

receive sentiment feedback from the first user device associated with the first notary session; and update the sentiment analysis algorithm based on the sentiment feedback.

15. The system of claim 11, wherein the instructions cause the one or more computer hardware processors to:

receive document classification feedback from the first notary device associated with the first document; and update the document classification machine learning algorithm based on the document classification feedback.

\* \* \* \* \*